US006527182B1

(12) United States Patent
Chiba et al.

(10) Patent No.: US 6,527,182 B1
(45) Date of Patent: Mar. 4, 2003

(54) IMAGE READING APPARATUS AND IMAGE PROCESSING APPARATUS

(75) Inventors: Hirotaka Chiba, Kanagawa (JP); Tsugio Noda, Kanagawa (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/560,353

(22) Filed: Apr. 28, 2000

(30) Foreign Application Priority Data

Jun. 4, 1999 (JP) .......................................... 11-158104

(51) Int. Cl.$^7$ ................................................ G06K 7/10
(52) U.S. Cl. ............ 235/462.11; 235/454; 235/462.41; 235/462.21; 235/462.24; 235/462.32; 235/462.33
(58) Field of Search .......................... 235/462.11, 454, 235/462.41, 462.33, 462.32, 462.21, 462.24

(56) References Cited

U.S. PATENT DOCUMENTS

| | | | | | |
|---|---|---|---|---|---|
| 3,947,817 A | * | 3/1976 | Reque | ................. | 235/61.11 X |
| 4,742,559 A | * | 5/1988 | Fujiwara et al. | ............ | 358/473 |
| 4,797,940 A | * | 1/1989 | Sato et al. | .............. | 235/470 X |
| 5,023,922 A | * | 6/1991 | Abramovitz et al. | .... | 235/472 X |
| 5,084,773 A | * | 1/1992 | Yonenaga | .................. | 358/472 |
| 5,306,908 A | * | 4/1994 | McConica et al. | ...... | 235/472 X |
| 5,886,332 A | * | 3/1999 | Plesko | ................... | 235/462.35 |
| 5,969,321 A | * | 10/1999 | Danielson et al. | ..... | 235/462.01 |
| 6,058,224 A | * | 5/2000 | Haga | ........................... | 358/473 |
| 6,173,893 B1 | * | 1/2001 | Maltsev et al. | ........ | 235/462.08 |
| 6,247,647 B1 | * | 6/2001 | Courtney et al. | ...... | 235/462.36 |
| 6,325,288 B1 | * | 12/2001 | Spitz | ..................... | 235/462.01 |

FOREIGN PATENT DOCUMENTS

| | | | |
|---|---|---|---|
| JP | 11-220587 | | 8/1999 |
| JP | 02001203859 | * | 7/2001 |

* cited by examiner

Primary Examiner—Thien M. Le
Assistant Examiner—Daniel Walsh
(74) Attorney, Agent, or Firm—Armstrong, Westerman & Hattori, LLP

(57) ABSTRACT

An image reading apparatus comprises an image reading section which optically reads one line of an image on a paper at a specific time interval and inputs the acquired image data to an image signal processing section which converts the image data into a binary image data. An amount of movement detection section is provided which outputs a signal to an image data generation section when the image reading section moves by one line. When such a signal is received more than one time during one time interval, the image data generation section generates a binary image data corresponding to the number of lines whose data is not available from the binary image data for a line acquired during that time interval.

12 Claims, 12 Drawing Sheets

IMAGE READING APPARATUS AND IMAGE PROCESSING APPARATUS

BACKGROUND OF THE INVENTION

1. Field of the Invention

The present invention relates in particular to an image reading apparatus and an image processing apparatus suitable for reading the image on an image reading medium by manual operation.

2. Description of the Related Art

In recent years, an image reading apparatus which reads an image on an image reading medium when it is moved over the image reading medium by the operator are widely used, apart from the well-known stationary (placed on a table or the like) image reading apparatus. Such an image reading apparatus (the movable one) is smaller in size and weight and has the advantage that the image can be read easily in comparison to the stationary image reading apparatus. It is expected that the demand of this type of apparatus will increase in the future. Although this type of apparatus is advantageous, because the apparatus is manually moved over the image, the speed with which the apparatus is moved naturally varies. Such variations in the moving speed deteriorate the quality of the read image. Accordingly, a manually operated image reading apparatus free of such a disadvantage is desired.

Image reading apparatuses, which optically read an image on an image reading medium (hereafter, a paper. However, an image reading medium is not limited to a paper) are roughly divided into three types including flat bed type, sheet feed type and handy type. The flat bed type and the sheet feed type of image reading apparatuses are stationary types of apparatuses in which a sheet(s) of paper(s) from where an image is to be read is set in a tray or the like provided in the apparatus. On the other hand, the handy type of apparatus is one that is manually moved (slide) on a sheet of paper from where an image is to be read. The size of such a handy type of image reading apparatus can be made smaller than that of the other two types of image reading apparatuses. Accordingly, the handy type of image reading apparatus can be easily carried with a laptop type of personal computer or a PDA (portable information terminal) and used where and when required.

FIG. 12 is a perspective view showing an example of an external appearance of a conventional image reading apparatus. All the important parts of the image reading apparatus are provided inside a housing 10 which is substantially rectangular in shape. One side of the housing 10, that is, image reading surface 10a comes into contact with a paper when reading an image from the paper. A transparent protective cover 12 is provided on a part of the image reading surface 10a which protects the optical parts of an image reading section. The image reading section is described later with reference to FIG. 10.

A roller 13 is provided on the image reading surface 10a and detects the amount of movement of the image reading apparatus when the apparatus is moved on the paper for reading the image. This roller 13 constitutes a part of an amount of movement detection section 22 described later. The roller 13 rotates in accordance with the amount of movement of the apparatus. A rotary encoder (not shown) detects an amount of rotation of the roller 13. A connector 14 is connected to the housing 10 through a cable 15. This connector can be inserted into a connector section 16a of a PC card 16. The PC card 16 is a card type interface which can be inserted into a card slot of an information processing system (for example, a personal computer, not shown).

Operation of the conventional image reading apparatus will be explained below. When reading the image on the paper, the user places the image reading apparatus in such a position that the image reading surface 10a touches the paper at the reading start position on the paper. In this condition, the roller 13 also touches the paper. The user then presses a switch once (not shown).

The user starts the operation of reading the image by sliding the case 10 on the paper in the direction of scanning. Frictional force is generated between the surface of the paper and the surface of the roller 13 due to which the roller 13 starts rotating. As the roller 13 starts rotating, detection of the amount of movement is also started.

When the amount of movement pulse which is output when the amount of movement is equal to the width of one line is input, then image data of one line is read. If the speed with which the case 10 is moved exceeds a speed specific to the image reading apparatus, many amount of movement pulses are input, however, image data of only one line is read.

When the case 10 is caused to slide to the reading end position on the paper, the user presses the switch once more so as to end the reading operation.

As described above, in the conventional image reading apparatus, if the speed with which the case 10 is moved exceeds the speed specific to the image reading apparatus, then the amount of movement pulses are output many times. In other words, in such a case, the case 10 is moved for a distance which is equivalent to the width of many lines. However, although the case 10 is moved for a distance which is equivalent to the width of many lines, image data of only one line is actually read.

Accordingly, in the conventional image reading apparatus, image data of only one line is displayed where in reality image data of many lines should have been displayed. As a consequence, the image gets contracted and the quality of the image degrades.

In order to solve the above-mentioned problem, the following measures are taken in the conventional image reading apparatus. That is, an alarm is generated when the scanning speed crosses the specified value, or it is mentioned in the operation manual(s) that the scanning should be performed steadily and at a constant slow speed. In the actual image reading operation, however, there is a tendency for the scanning speed to increase without notice as the operation is repeated several times. Therefore, it cannot be said that the measures taken in the conventional image reading apparatus are the effective solutions to the problem.

SUMMARY OF THE INVENTION

It is an object of the present invention to provide an image reading apparatus and an image processing apparatus that are free from the effect of variation in the scanning speed and capable of producing an image not contracted in the scanning direction.

In order to achieve the above-mentioned object, the image reading apparatus, according to one aspect of the present invention, comprises an image reading unit, an amount of movement detection unit, and an image data generation unit. Once the read operation is started, the image reading unit reads one line of the image on the image reading medium at predetermined time intervals and outputs it as image data. Further, the amount of movement detection unit detects the moving mount of the image reading unit relative to the image reading medium. In the case where the number of lines of the image data read is reduced below the number of lines moved as the result of the scanning speed increased beyond a specified value, the image data generation unit generates the image data corresponding to the shortage to attain the number of lines equal to the number of lines moved.

Thus, even in the case where the scanning speed is higher than a specified value, the image data of the same number of lines as the number of lines moved by the image reading unit are generated by the image data generation unit, and therefore an image free of contraction in the scanning direction is obtained.

Further, the image data generation unit generates image data for a plurality of the lines based on the image data of one line in the image reading unit when the image reading unit has moved for a plurality of lines within one time period. Thus, when the image reading unit moves for a plurality of lines during one time period, i.e., when the scanning speed is greater than a specified value, the image data generation unit generates image data for a plurality of lines based on the image data of one line acquired by the image reading unit. Accordingly, the image data for a plurality of lines is generated based on the image data of one line in the image reading unit, and therefore even in the case where the scanning speed is higher than a specified value, an image free of contraction in the scanning direction is obtained.

Further, the image data generation unit duplicates the image data of one line in the image reading unit thereby to generate the image data for a plurality of lines when the image reading unit moves for a plurality of lines during one time period. Thus, when the image reading unit moves for a plurality of lines during one time period, i.e., when the scanning speed is greater than a specified value, the image data generation unit generates image data for plurality of lines by duplicating the image data of one line acquired by the image reading unit. Accordingly, the image data of a plurality of lines is generated by duplicating the image data of one line acquired by the image reading unit, and therefore even in the case where the scanning speed is higher than a specified value, an image free of contraction in the scanning direction is obtained.

Further, a storage unit and a transfer unit are provided. The transfer unit causes the storage unit to store the image data in the image reading unit and the image data generated by the image data generation unit, reads the image data from the storage unit and transfers the image data to an external device through an interface. Thus, the image data to be transferred to an external device are stored in the storage unit, and after being read from the storage unit by the transfer unit, transferred to the external device through an interface. Therefore, the data can be transferred to the external device independently of the reading speed of the image reading unit or the processing speed of the image data generation unit. Also, according to the fourth aspect, the data transfer speed is independent of the reading speed or the processing speed, and therefore an interface of low transmission speed can be used, thereby improving the versatility of the image reading apparatus.

The image reading apparatus according to another aspect of the present invention comprises an image reading unit, an amount of movement detection unit, a transfer unit, and an image data generation unit. The image reading unit reads one line of the image on the image reading medium at predetermined time intervals, and outputs them as image data. The amount of movement detection unit detects the amount of movement of the image reading unit relative to the image reading medium. The transfer unit transfers the detection result of the amount of movement detection unit together with the image data acquired by the image reading unit to the image data generation unit through the interface. Thus, when the number of lines of the image data read is reduced below the number of lines moved as the result of the scanning speed being increased beyond a specified value, the image data generation unit generates image data corresponding to the shortage so as to attain the same number of lines as the number of lines moved. Further, the image data is generated in the image data generation unit so that the amount of data generated in the image reading unit is minimized and, hence, the size and cost of the image reading apparatus can be reduced.

The image processing apparatus according to still another aspect of the present invention comprises an image reading unit, an amount of movement detection unit, and an image data generation unit. Once the read operation is started, the image reading unit reads one line of the image on the image reading medium at predetermined time intervals and outputs it as image data. Further, the amount of movement detection unit detects the moving mount of the image reading unit relative to the image reading medium. In the case where the number of lines of the image data read is reduced below the number of lines moved as the result of the scanning speed increased beyond a specified value, the image data generation unit generates the image data corresponding to the shortage to attain the number of lines equal to the number of lines moved.

Thus, even in the case where the scanning speed is higher than a specified value, the image data of the same number of lines as the number of lines moved by the image reading unit are generated by the image data generation unit, and therefore an image free of contraction in the scanning direction is obtained.

The image processing apparatus according to still another aspect of the present invention comprises an image data generation unit and the image data is received from an image processing apparatus. The image data generation unit obtains the image data for the missing lines.

Other objects and features of this invention will become apparent from the following description with reference to the accompanying drawings.

DETAILED DESCRIPTION OF THE PREFERRED EMBODIMENTS

An image reading apparatus and an image processing apparatus according to first to third embodiments of the present invention will be explained in detail below with reference to the drawings.

Figure 1:
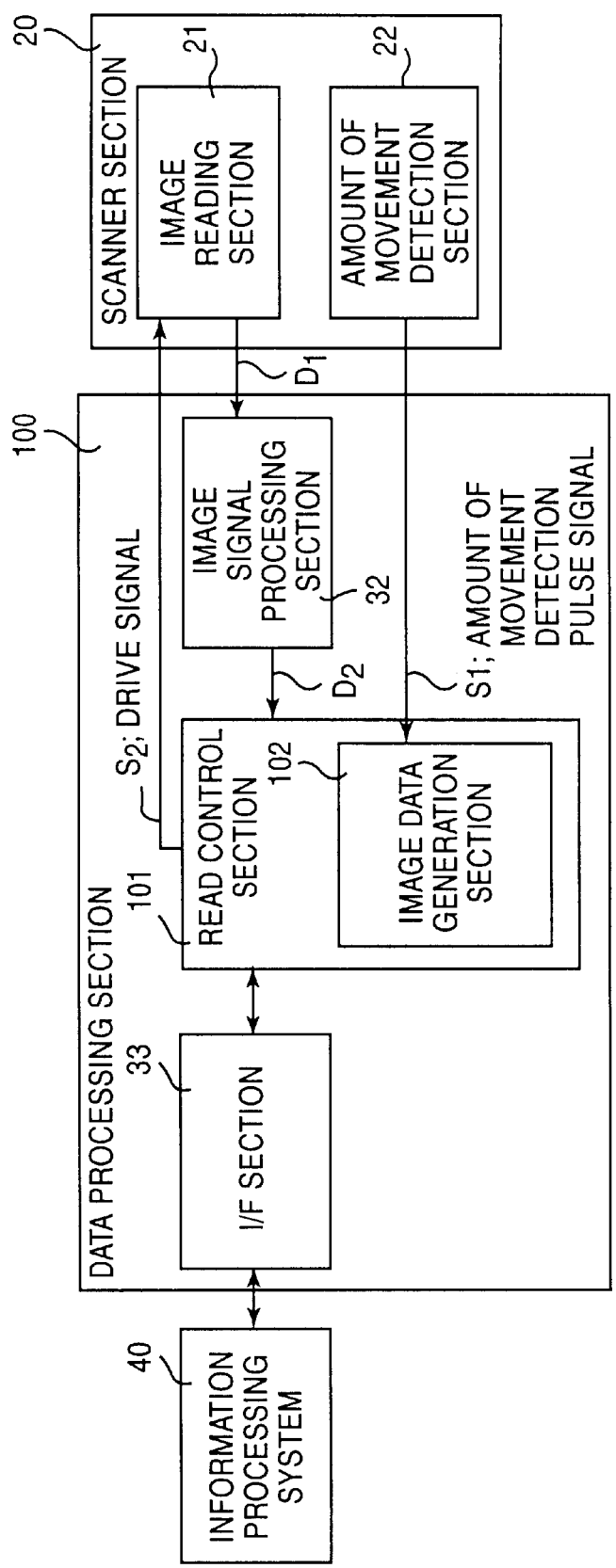
FIG. 1 is a block diagram which shows a configuration according to a first embodiment of the invention.

FIG. 1 is a block diagram which shows a configuration of the first embodiment of the invention. As shown in the figure, the image reading apparatus has a scanner section 20 and a data processing section 100. The scanner section 20 has an image reading section 21 and an amount of movement detection section 22. The image reading section 21 in the scanner section 20 optically reads the image on the paper. The image reading section 21 generally includes a light source (light-emitting diode, a cold cathode tube, etc.) for radiating light on the paper, a photo detector (CCD (charged coupled device), etc.) for receiving the light reflected from the paper and converting the received light into image data $D_1$, and a lens arranged in the vicinity of the light source and the photo detector. This image reading section 21 sequentially reads a line of image on the paper and outputs them as image data $D_1$ as triggered by a drive signal $S_2$ (see (b) in FIG. 2) input at predetermined periods. The drive signal $S_2$ is provided by a read control section 101 in the data processing section 100 as described later.

Figure 2:
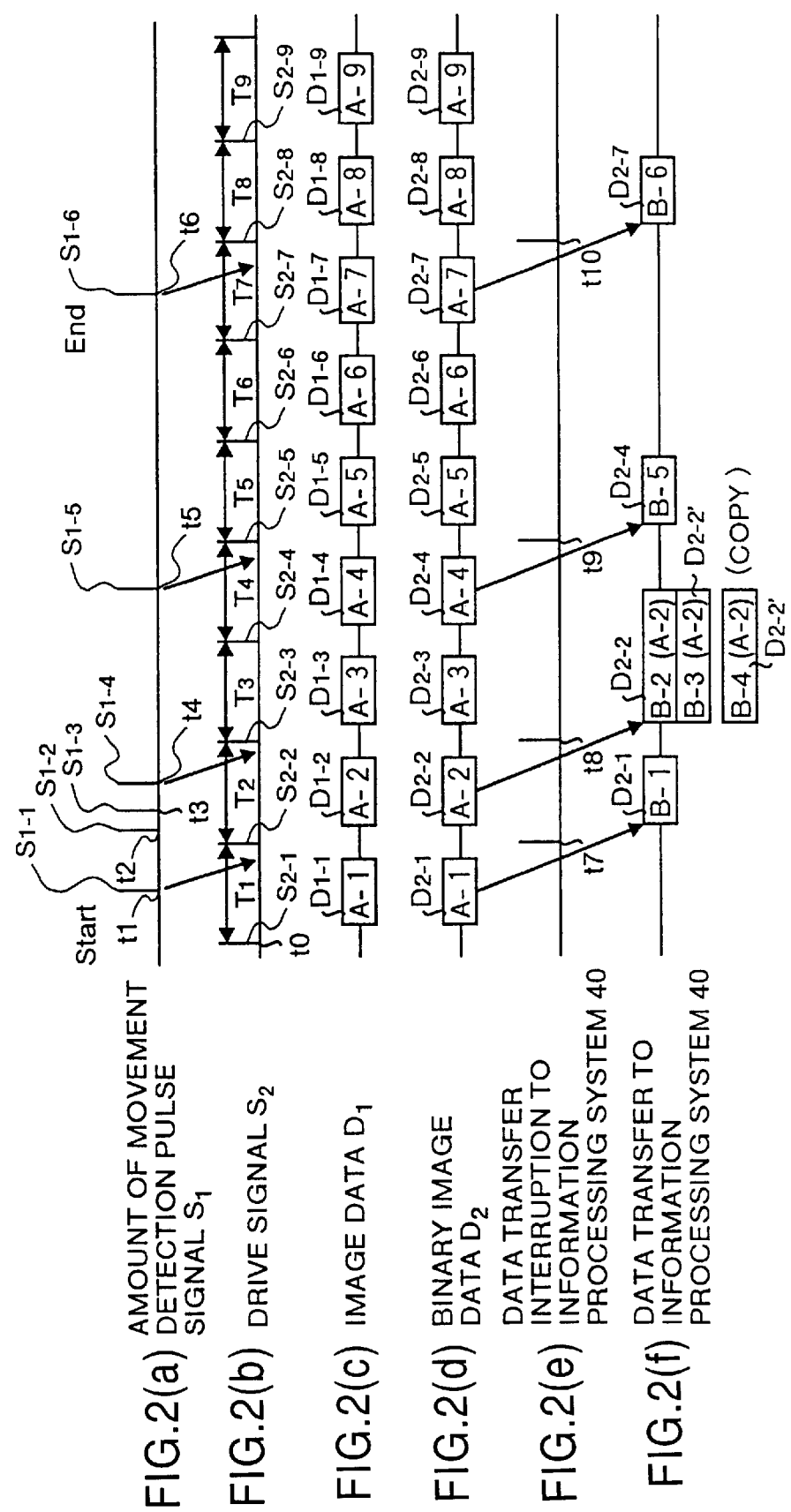
FIG. 2 is a timing chart which explains the operation of the first embodiment.

The amount of movement detection section 22 outputs a movement detection pulse signal $S_1$ (see (a) in FIG. 2) each time the roller 13 rotates for a predetermined angle. In other words, the amount of movement detection section 22 outputs the moving amount of movement detection pulse signal $S_1$ each time the image reading section 21 (image reading apparatus) is moved in the scanning direction over a predetermined distance on the paper.

The data processing section 100 comprises a read control section 101, the image signal processing section 32, and an I/F (interface) section 33. The image signal processing section 32 receives the image data $D_1$ from the image reading section 21, compares this analog image data $D_1$ with a threshold thereby obtaining the binary (digitized) image data $D_2$. The image signal processing section 32 then outputs the binary image data $D_2$ to the read control section 101.

The read control section 101 outputs the drive signal $S_2$ for driving the image reading section 21 and also receives the binary image data $D_2$ from the image signal processing section 32. Further, the read control section 101 provides a control over the transfer of the binary image data $D_2$ in the case where the amount of movement detection pulse signal $S_1$ is input at least once within one drive period ($T_1$, $T_2$, ...; see (b) in FIG. 2). The image data generation section 102 generates one more set of binary image data $D_2$ by copying the binary image data $D_2$ that originally should have been transferred to the information processing system 40, when the amount of movement detection pulse signal $S_1$ is received a plurality of times within one drive period.

Figure 12:
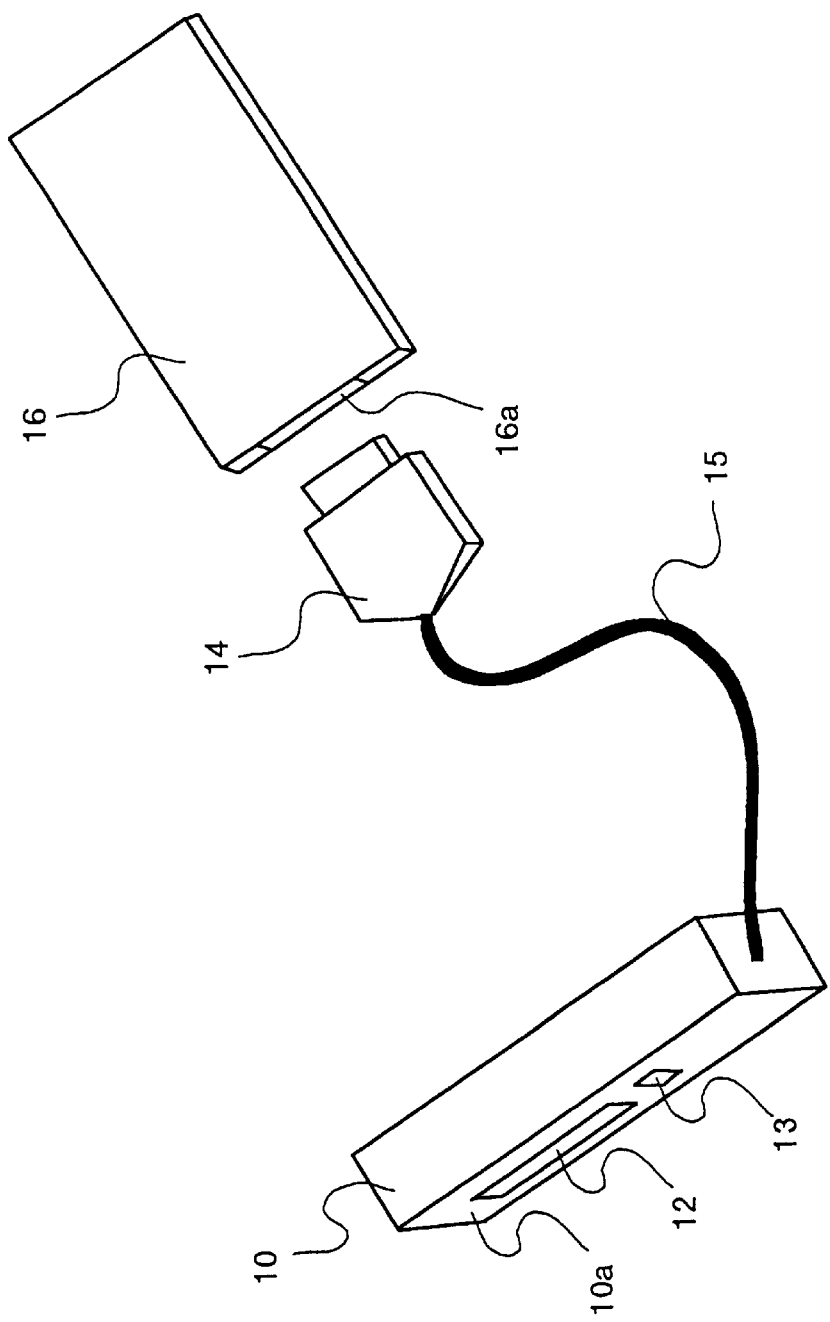
FIG. 12 is a perspective view which shows an example of the external appearance and configuration of a conventional image reading apparatus.

The I/F section 33 functions as an interface between the information processing system 40 and the read control section 101. This I/F section 33 is configured with the cable 15, the connector 14 and the PC card 16 shown in FIG. 12. The information processing system 40 is a computer which displays the binary image data $D_2$ transferred from the read control section 101 on a display unit (not shown). The information processing system 40 performs almost all the functions a usual computer can perform.

Operation of the first embodiment will be explained here with reference to the timing chart shown in FIG. 2, the flowchart shown in FIG. 3 and the FIG. 4. As shown in (a) in FIG. 2, the amount of movement detection pulse signal $S_1$ at different timings is denoted as amount of movement detection pulse signals $S_{1-1}$, $S_{1-2}$, $S_{1-3}$, ..., $S_{1-6}$. Similarly, as shown in (b) in FIG. 2, the drive signal $S_2$ at different timings are denoted as drive signals $S_{2-1}$, $S_{2-2}$, ... $S_{2-9}$ corresponding to the drive periods $T_1$, $T_2$, ..., $T_9$.

Similarly, as shown in (c) in FIG. 2, the image data $D_1$ input from the image reading section 21 at different timings are denoted as image data $D_{1-1}$, $D_{1-2}$, ..., $D_{1-9}$ corresponding to the drive periods $T_1$, $T_2$, ..., $T_9$. Further, the numbers for identifying the image data $D_{1-1}$, $D_{1-2}$, ..., $D_{1-9}$ are expressed as input line numbers A-1, A-2, ..., A-9, respectively. It should be noted here that the input line numbers A-1, A-2, ..., A-9 are serial numbers of the image data $D_1$ input at intervals of the drive period from the image reading section 21, but not the numbers corresponding to the lines on the paper. As shown in (d) in FIG. 2, the binary image data $D_2$ for different lines are denoted as $D_{2-1}$, $D_{2-2}$, ..., $D_{2-9}$ corresponding to the image data $D_{1-1}$, $D_{1-2}$, ..., $D_{1-9}$, respectively. Further, input line numbers A-1 A-2, ..., A-9 are assigned to these binary image data $D_{2-1}$, $D_{2-2}$, ..., $D_{2-9}$, respectively.

The user places the image reading apparatus on the paper, on which an image is recorded, in a manner such that the image reading surface 10a touches the paper at the read starting position on the paper. In this state the roller 13 comes into contact with the paper. The user presses the switch (not shown) once which indicates start of scanning. When the switch is pressed once, the read control section 101 outputs the drive signal $S_{2-1}$, to the image reading section 21 at the time point $t_0$ shown in (b) in FIG. 2. Then the read control section 101 performs the process in step SA1 shown in FIG. 3.

As a result, the image reading section 21 is driven, and an image of one line is read from the paper for each drive period. In other words, the image reading section 21 outputs the image data $D_{1-1}$ shown in (c) in FIG. 2 to the image signal processing section 32 during the drive period $T_1$. The image signal processing section 32 converts the image data $D_{1-1}$ to binary image data $D_{2-1}$, as shown in (d) in FIG. 2, and inputs this binary image data $D_{2-1}$, to the read control section 101. Although not shown in FIG. 1, the read control section 101 has a buffer memory. The read control section 101 stores the binary image data $D_{2-1}$ (corresponding to the input line number A-1) shown in FIG. 4 in the buffer memory until it receives the next binary image data $D_{2-2}$ during the next drive period $T_2$.

Figure 3:
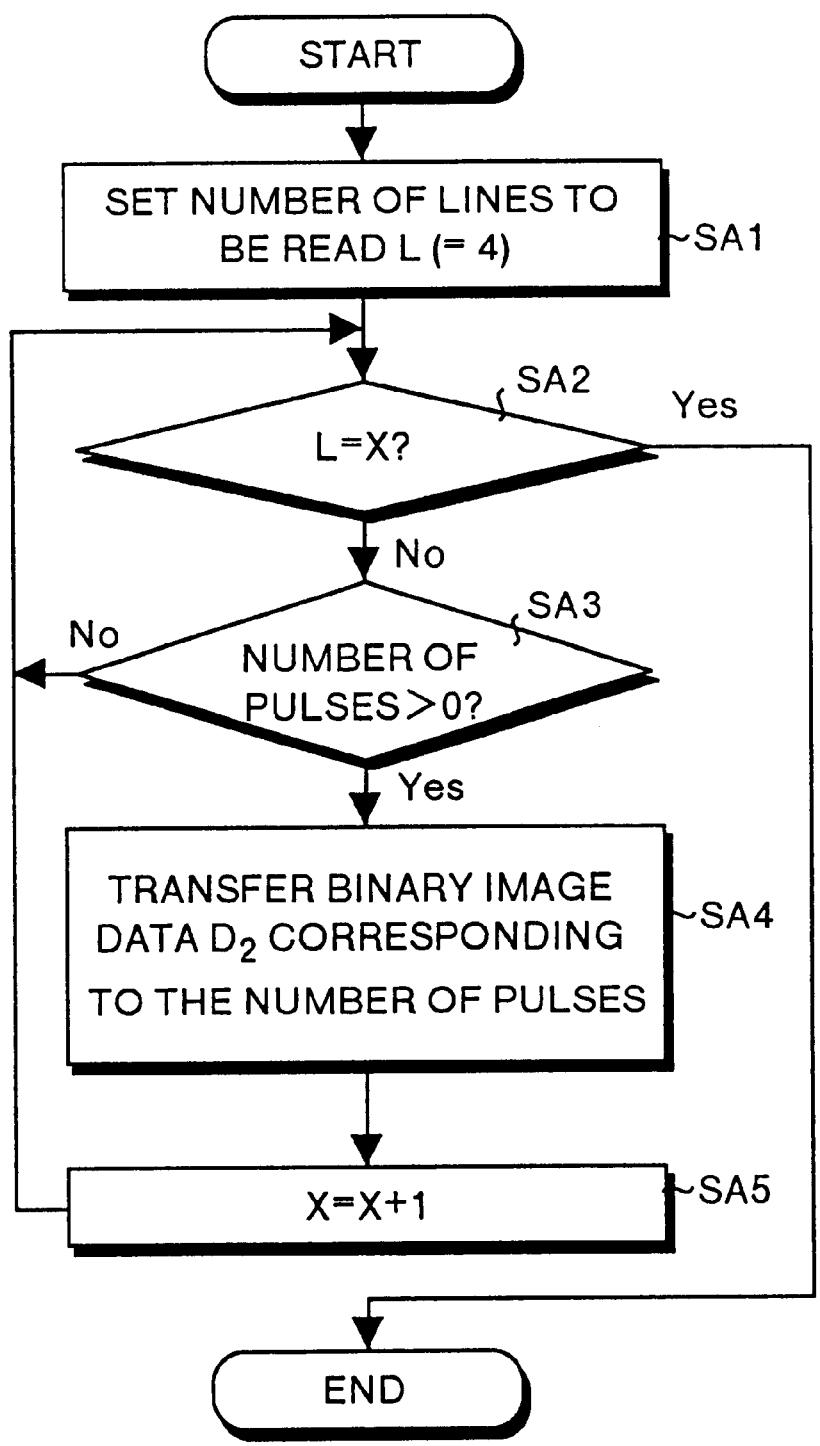
FIG. 3 is a flowchart which explains the operation of the first embodiment.

In step SA1 of FIG. 3, the read control section 101 sets the number of lines to be read L. The number of lines to be read L is the number of lines on the read image corresponding to one set in the image read operation. The number of lines required for reading the paper can be calculated from the size of the paper and the resolution of the image printed on the paper. Thus, when the size of the paper has been indicated by the user before starting the reading operation, the number of lines is calculated based on the indicated size and set as the number of lines to be read L. On the other hand, the number of lines is not calculated but is instead a fixed value which is stored in a memory or the like in advance. In this case, the number of lines is read from the memory and set as the number of lines to be read L. Likewise, a predetermined value may be set as the number of lines to be read L regardless of the size of the paper. In this case, there is no need to perform any calculation, nor it is required to provide any memory.

For convenience it is assumed that the number of lines to be read L is set to 4. In other words, the image for four lines is determined as one set. Once the number of lines to be read L is set, the read control section 101 performs the processing at step SA2. At step SA2, the read control section 101 determines whether or not the number of lines to be read L is equal to the number of lines that have been read X. The number of lines that have been read X is the number of lines of the image actually read by the image reading section 21 which is to be transferred to the information processing system 40. In other words, the number of lines that have been read X is the number of lines of the binary image data $D_2$ validated in the read control section 101.

When the image reading apparatus is not caused to slide over the paper, then no image data will be read and, hence, the number of lines that have been read X will be zero. When the number of lines that have been read X is zero, the result of determination at step SA2 will be NO. At step SA3, the read control section 101 determines whether or not the amount of movement detection pulse signal $S_1$ is received at least once (in terms of the number of pulses) during the drive period $T_1$. When no amount of movement detection pulse signal $S_1$ is input, the result of determination at step SA3 will be NO. In such a case, the read control section 101 performs the processing at step SA2 and repeats the processing in steps SA2 and SA3.

When the user presses the switch once and slides the housing 10 on the paper in the scanning direction, then the roller 13 is rotated because of the friction with the surface of the paper. The rotary encoder provided with the roller 13 detects whether or not the roller 13 has rotated for a predetermined amount. When the rotary encoder detects that the roller 13 has rotated for the predetermined amount, the amount of movement detection section 22 outputs the moving amount of movement detection pulse signal $S_1$. Assuming that the roller 13 rotates for the predetermined amount during the drive period $T_1$, the amount of movement detection pulse signal $S_{1-1}$ will be input into the read control section 101 from the amount of movement detection section 22 at the time point $t_1$ shown in (a) in FIG. 2. In this case, because the amount of movement detection pulse signal $S_1$ (that is, the pulse signal $S_{1-1}$) is has been input into the read control section 101, the result of determination at step SA3 will be YES. In such a case, the read control section 101 performs the processing at step SA4. Amount of movement data M shown in FIG. 4 indicates the number of times the amount of movement detection pulse signal $S_1$ is input into the read control section 101 during one drive period. Thus, the amount of movement data M of "1" corresponding to the input line number A-1 indicates that only one amount of movement detection pulse signal $S_1$ (that is, pulse signal $S_{1-1}$) is input into the read control section 101 during one drive period (that is, drive period $T_1$).

At step SA4, the read control section 101 interrupts the information processing system 40 for data transfer at the time point $t_7$ shown in (e) in FIG. 2. In other words, the read control section 101 reads the binary image data $D_{2-1}$ (see (d) in FIG. 2) of the input line number A-1 at the time point $t_7$ from the buffer memory. The read control section 101 transfers the binary image data $D_{2-1}$ corresponding to the number of pulse ("1" in this case) to the information processing system 40 (see (f) in FIG. 2 and FIG. 4) through the I/F section 33. The read control section 101 then performs the processing at step SA5. The valid line number B-1 shown in FIG. 4 is for identifying the binary image data $D_{2-1}$ transferred to the information processing system 40 and corresponds to the line on the paper.

At step SA5, the read control section 101 increments by 1 the number of lines that have been read X. Thus, the number of lines that have been read X will become "1" The read control section 101 then performs the processing at step SA2. During the next drive period $T_2$, the drive signal $S_{2-2}$ is input into the image reading section 21 and the image reading section 21 collects the image data $D_{1-2}$ corresponding to the input line number A-2 and inputs it into the image signal processing section 32. The image signal processing section 32 converts this image data $D_{1-2}$ into the binary image data $D_{2-2}$ and inputs it into the read control section 101. The read control section 101 stores this binary image data $D_{2-2}$ corresponding to the input line number A-2 in the buffer memory (not shown).

At step SA2, the read control section 101 again determines whether or not the number of lines to be read L is equal to the number of lines that have been read X. Because the number of lines to be read L is equal to "4" and the number of lines that have been read X is equal to "1", the result of determination at step SA2 will again be NO. Therefore, the read control section 101 performs the processing at step SA3. At step SA3, the read control section 101 determines whether or not at least one amount of movement detection pulse signals $S_1$ is received during the next drive period (that is, the drive period $T_2$).

Assume that the amount of movement detection pulse signals $S_{1-2}$, $S_{1-3}$ and $S_{1-4}$ are one-by-one received by the read control section 101 at the time points $t_2$, $t_3$ and $t_4$ shown in (a) in FIG. 2 during the drive period $T_2$. This phenomenon of reception of three amount of movement pulse signals $S_1$ during one drive period $T_2$ will occur when the scanning speed is greater than the specified value. In this case, as shown in FIG. 4, the amount of movement data M for the binary image data $D_{2-2}$ of the input line number A-2 will be "3".

Because three amount of movement detection pulse signals $S_{1-2}$, $S_{1-3}$ and $S_{1-4}$ are received by the read control section 101, the result of the determination at step SA3 will be YES. At the next step SA4, the read control section 101 interrupts the information processing system 40 for data transfer at the time point $t_8$ shown in (e) in FIG. 2. However, when multiple pulse signals are received in one drive period, the read control section 101 sends the binary image data $D_{2-2}$ corresponding to the input line number A-2 in the buffer memory at the time point $t_8$ and the amount of movement data M (in this case "3") to the image data generation section 102.

In reality, the image data $D_1$ for two lines corresponding to the amount of movement detection pulse signals $S_{1-2}$ and $S_{1-3}$ have not been acquired. Therefore, conventionally, the binary image data $D_2$ corresponding to these two pulse signals will not be naturally sent to the information processing system 40. Thus, when regenerating the read image, because the data corresponding to these two pulse signals is missing, the image displayed on the display unit of the information processing system 40 will be a contracted one. In order to overcome this problem, as explained below, the image data of the two lines, those of which have not been actually read, are intrapolated from the image data $D_1$ of one line that has been read.

Figure 4:
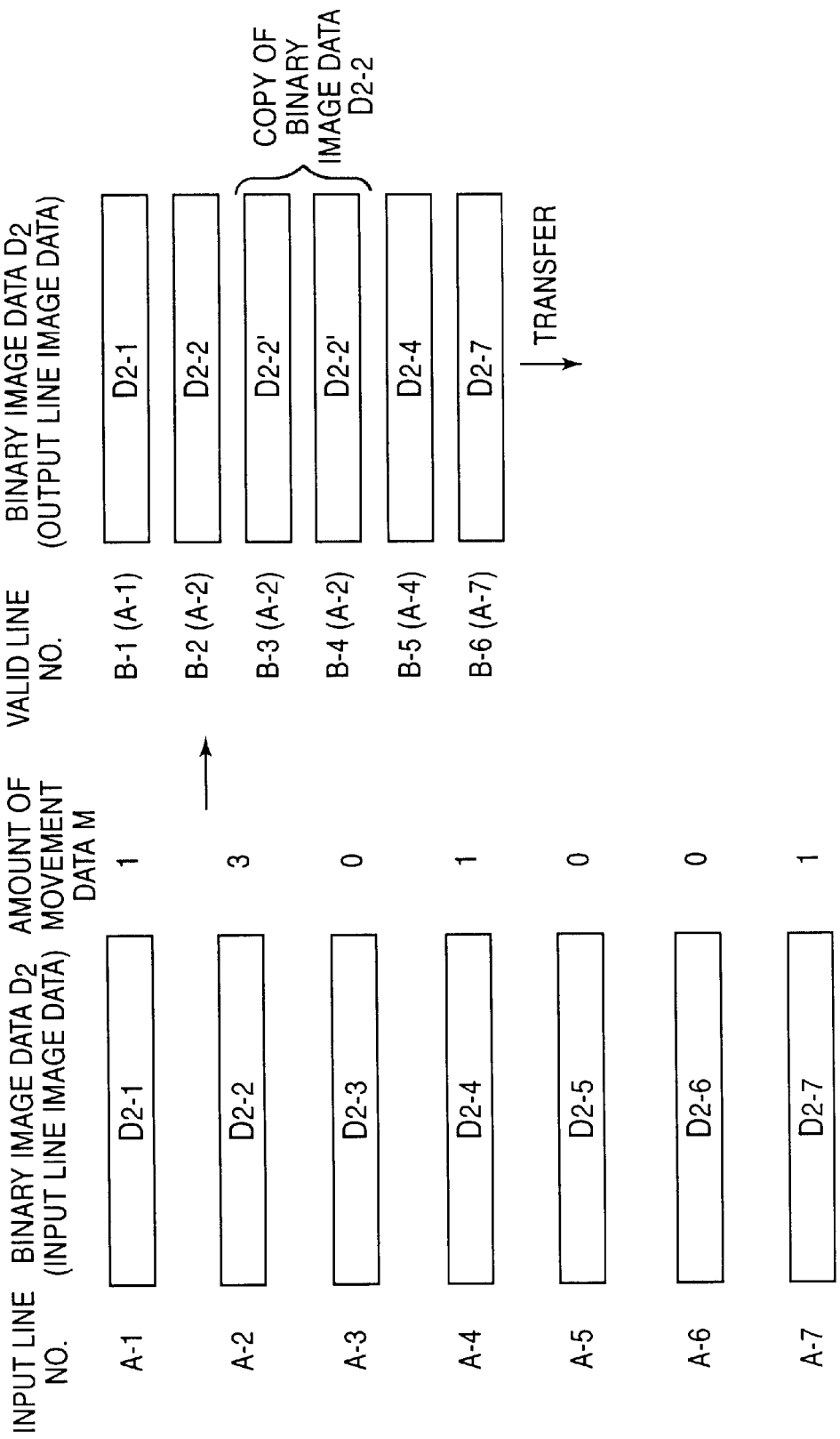
FIG. 4 is a diagram which explains the operation of the first embodiment.

Precisely, the image data generation section 102, as shown in FIG. 4, generates two lines of the same binary image data $D_{2-2}'$ by copying the binary image data $D_{2-2}$ of the input line number A-2 corresponding to the amount of movement data M-1 (=3−1=2). Then, the image data generation section 102 stores the binary image data $D_{2-2}$, $D_{2-2}'$ and $D_{2-2}'$ for three lines in the buffer memory. The line numbers of the binary image data $D_{2-2}$, $D_{2-2}'$ and $D_{2-2}'$ for the three lines are the valid line numbers B-2, B-3 and B-4, respectively, shown in FIG. 4.

The read control section 101 reads at the time point $t_8$ the binary image data $D_{2-2}$, $D_{2-2}'$ and $D_{2-2}'$ stored in the buffer memory of the image data generation section 102, and transfers these data to the information processing system 40 through the I/F section 33 (see (f) in FIG. 2). At the next step SA5, the read control section 101 increments the number of lines that have been read X by one, and returns to the processing at step SA2. Because the number of lines that have been read X is "1", after the increment it will become "2". During the next drive period $T_3$, the image reading section 21 inputs the drive signal $S_{2-3}$ into the image signal processing section 32. The image signal processing section 32 converts the image data $D_{1-3}$ into the binary image data $D_{2-3}$. The read control section 101 stores this binary image data $D_{2-3}$ in the buffer memory (not shown).

Assume that, as shown in FIG. 2, amount of movement detection pulse signal $S_1$ (corresponding to the image data $D_{1-3}$) is not input into the read control section 101 during the next drive period $T_3$. In this case, the amount of movement data M corresponding to the binary image data $D_{2-3}$ (corresponding to the input line number A-3) will be "0" as shown in FIG. 4. Therefore, the read control section 101 will not transfer the binary image data $D_{2-3}$ to the information processing system 40 and hold it in the buffer memory. During the next drive period $T_4$, the read control section 101 inputs the drive signal $S_{2-4}$ into the image reading section 21. Accordingly, as shown in FIG. 2, the image reading section 21 outputs the image data $D_{1-4}$ (corresponding to the input line number A-4) to the image signal processing section 32. The image signal processing section 32 converts this image data $D_{1-4}$ into the binary image data $D_{2-4}$.

Here, the binary image data $D_{2-4}$ is stored in the buffer memory (not shown) of the read control section 101. However, the image data $D_{2-3}$ is already present in the buffer memory. Therefore, the binary image data $D_{2-3}$ present in the buffer memory will be updated to the newly input binary image data $D_{2-4}$. Assume that, as shown in FIG. 2, an amount of movement detection pulse signal $S_{1-5}$ is input at the time point $t_5$ into the read control section 101 during the time period $T_4$. In this case, the result of determination at step SA3 will be YES. At step SA4, the read control section 101 interrupts the information processing system 40 for data transfer at the time point $t_9$ shown in (e) in FIG. 2. Precisely, the read control section 101 reads the binary image data $D_{2-4}$ from the buffer memory at the time point $t_9$, and then transfers it to the information processing system 40 as the data corresponding to the valid line number B-5.

At the next step SA5, the read control section 101 increments the number of lines that have been read X by one. Because the current number of lines that have been read X is equal to "2", after increment it will become "3". The read control section 101 then returns to processing at step SA2 and repeats the processing from step SA2 to step SA5. Assume that, as shown in FIG. 2, an amount of movement detection pulse signal $S_1$ is not input into the read control section 101 during the drive periods $T_5$ and $T_6$. Therefore, the amount of movement data M corresponding to the binary image data $D_{2-5}$ and $D_{2-6}$ shown in FIG. 4 will be zero. Accordingly, the read control section 101 will not transfer the binary image data $D_{2-5}$ and $D_{2-6}$ to the information processing system 40 but hold the data in the buffer memory.

Assume that, the binary image data $D_{2-5}$ and $D_{2-6}$ in the buffer memory of the read control section 101 has been updated with the binary image data $D_{2-7}$. The read control section 101 receives an amount of movement detection pulse signal $S_{1-6}$ at the time point $t_6$ during the drive period $T_7$ from the amount of movement detection section 22. Therefore, the result of determination at the step SA3 will be YES. Because only one pulse signal is received, the amount of movement data M corresponding to the binary image data $D_{2-7}$ will be "1". Therefore, read control section 101 interrupts the information processing system 40 for data transfer at the time point $t_{10}$ shown in FIG. 2.

Precisely, the read control section 101 at the time point $t_{10}$ reads the binary image data $D_{2-7}$ from the buffer memory and transfers it to the information processing system 40 as the data corresponding to the valid line number B-6. At the next step SA5, the read control section 101 increments the number of lines that have been read X by one. Because the current number of lines that have been read X is equal to "3", after incrementing it will become "4". The read control section 101 then returns to processing at step SA2. However, because the already set number of lines to be read L, that is "4", is equal to the number of lines that have been read X, that is "4", the result of the determination at step SA2 will be YES. Therefore, the read control section 101 terminates the process in the flowchart of FIG. 3.

As described above, according to the first embodiment, when the scanning speed is greater than the specified value because of which the amount of movement detection pulse signal $S_1$ is generated a plurality of times during one drive period (like during the drive period $T_2$ shown in FIG. 2), the image data generation section creates the binary image data $D_2$ corresponding to all of the generated pulses by copying the available binary image data $D_2$. The read control section 101 then transfers the binary image data $D_2$ corresponding to all of the generated pulses to the information processing system 40. Therefore, even if the scanning speed faster than the specified value, an image free of contraction can be regenerated in the information processing system 40.

In other words, as shown in FIG. 2, amount of movement detection pulses $S_1$ are generated six times during the drive periods $T_1$ to $T_7$. Because of a faster scanning speed, the amount of movement detection pulse signal $S_1$ is generated three times during the drive period $T_2$. Conventionally, even if three amount of movement detection pulse signals $S_1$ are generated during the drive period $T_2$, binary image data $D_2$ of only one line is transferred to the information processing system 40, which results with contraction of the image.

On the contrary, according to the first embodiment, image data generation section 102 generates the binary image data $D_{2-2}$, $D_{2-2}'$ and $D_{2-2}'$ corresponding to three lines (see FIG. 4; valid line numbers B-2, B-3 and B-4), and the read control section transfers this binary image data $D_{2-2}$, $D_{2-2}'$ and $D_{2-2}'$ to the information processing system 40. Thus, the binary image data $D_{2-1}$, $D_{2-2}$, $D_{2-2}'$, $D_{2-2}'$, $D_{2-4}$ and $D_{2-7}$ for six lines shown in (f) in FIG. 2 corresponding to the amount of movement detection signals $S_{1-1}$, $S_{1-2}$, $S_{1-3}$, $S_{1-4}$, $S_{1-5}$ and $S_{1-6}$ input six times during the drive periods $T_1$ to $T_7$ are transferred to the information processing system 40, and therefore an image free of contraction can be obtained.

By the way, according to the first embodiment described above, the number of lines to be read L is set to 4. Therefore, as compared with the binary image data $D_2$ for six lines transferred to the information processing system 40, the binary image data $D_2$ for two lines are extraneously obtained. In such a case, the binary image data $D_2$ for two lines (such as the binary image data $D_{2-4}$ and $D_{2-7}$ of the valid input line numbers B-5 and B-6 shown in FIG. 4) among the binary image data $D_2$ for six lines can be discarded or otherwise an appropriate measure is taken.

In the first embodiment, the binary image data is once stored in a buffer memory before it is transferred to the information processing system 40. Thus, a buffer memory having a large capacity is required to be provided so that the size of the apparatus cannot be reduced much. The second embodiment described below solves this problem.

The basic configuration of the second embodiment is similar to the configuration shown in FIG. 1 with the only difference that the image data generation section 102 is not provided. Therefore, FIG. 1 will be referred to in the following explanation.

Operation of the second embodiment will be explained with reference to a flowchart shown in FIG. 5, timing charts shown in FIG. 6 and FIG. 7. Steps SB1 to SB3 and step SB5 in FIG. 5 correspond to steps SA1 to SA3 and step SA5 shown in FIG. 3. Thus, step SB4 is the characteristic of this second embodiment. Further, the timing charts shown in (a) to (e) in FIG. 6 correspond to the timing charts shown in (a) to (e) in FIG. 2. Thus, the timing chart shown in (f) in FIG. 6 is the characteristic of this second embodiment.

The read control section 101 shown in FIG. 1 transfers the amount of movement data M together with the binary image data $D_2$ (output line image data) to the information processing system 40 when transferring the binary image data $D_2$ to the information processing system 40. The information processing system 40 generates the restored image data shown in FIG. 7 based on the received binary image data $D_2$ (output line image data) and the amount of movement data M.

The user performs an image reading operation with the image reading apparatus. That is, the user places the image reading apparatus on the paper, on which an image is recorded, in such a manner that the image reading surface 10a touches the paper at the read starting position on the paper. In this state the roller 13 comes into contact with the paper. The user presses the switch (not shown) once which indicates start of scanning. When the switch is pressed once, the read control section 101 outputs the drive signal $S_{2-1}$ to the image reading section 21 at the time point $t_0$ shown in (b) in FIG. 6. Then the read control section 101 performs the process at step SB1 shown in FIG. 3.

As a result, the image reading section 21 is driven, and an image of one line is read from the paper for each drive period. In other words, the image reading section 21 outputs the image data $D_{1-1}$ shown in (c) in FIG. 6 to the image signal processing section 32 during the drive period $T_1$. The image signal processing section 32 converts the image data $D_{1-1}$ to binary image data $D_{2-1}$ as shown in (d) in FIG. 6, and inputs this binary image data $D_{2-1}$ to the read control section 101. Although not shown in FIG. 1, the read control section 101 has a buffer memory. The read control section 101 stores the binary image data $D_{2-1}$ in this buffer memory.

Figure 5:
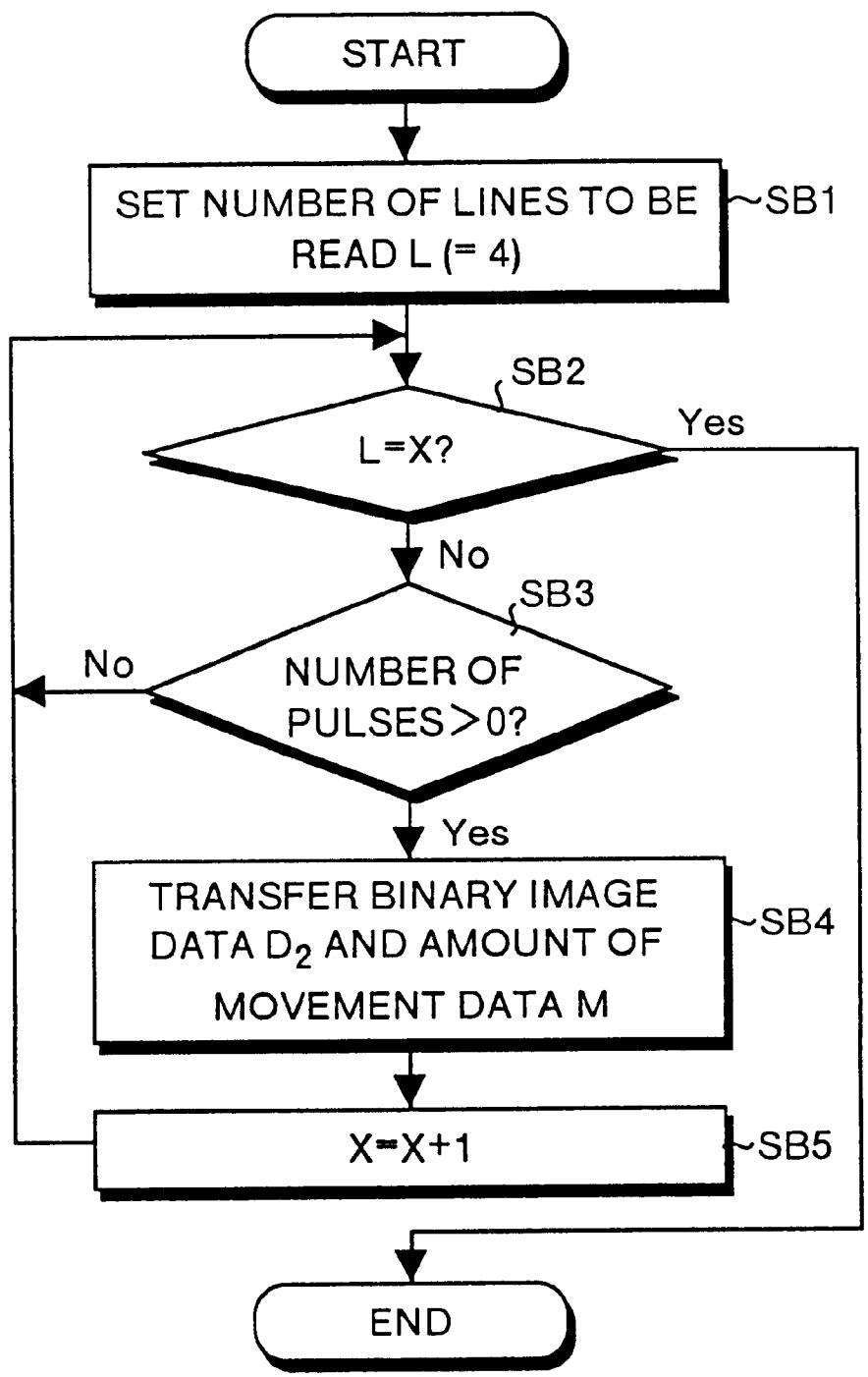
FIG. 5 is a flowchart which explains the operation of a second embodiment of the invention.
Figure 6:
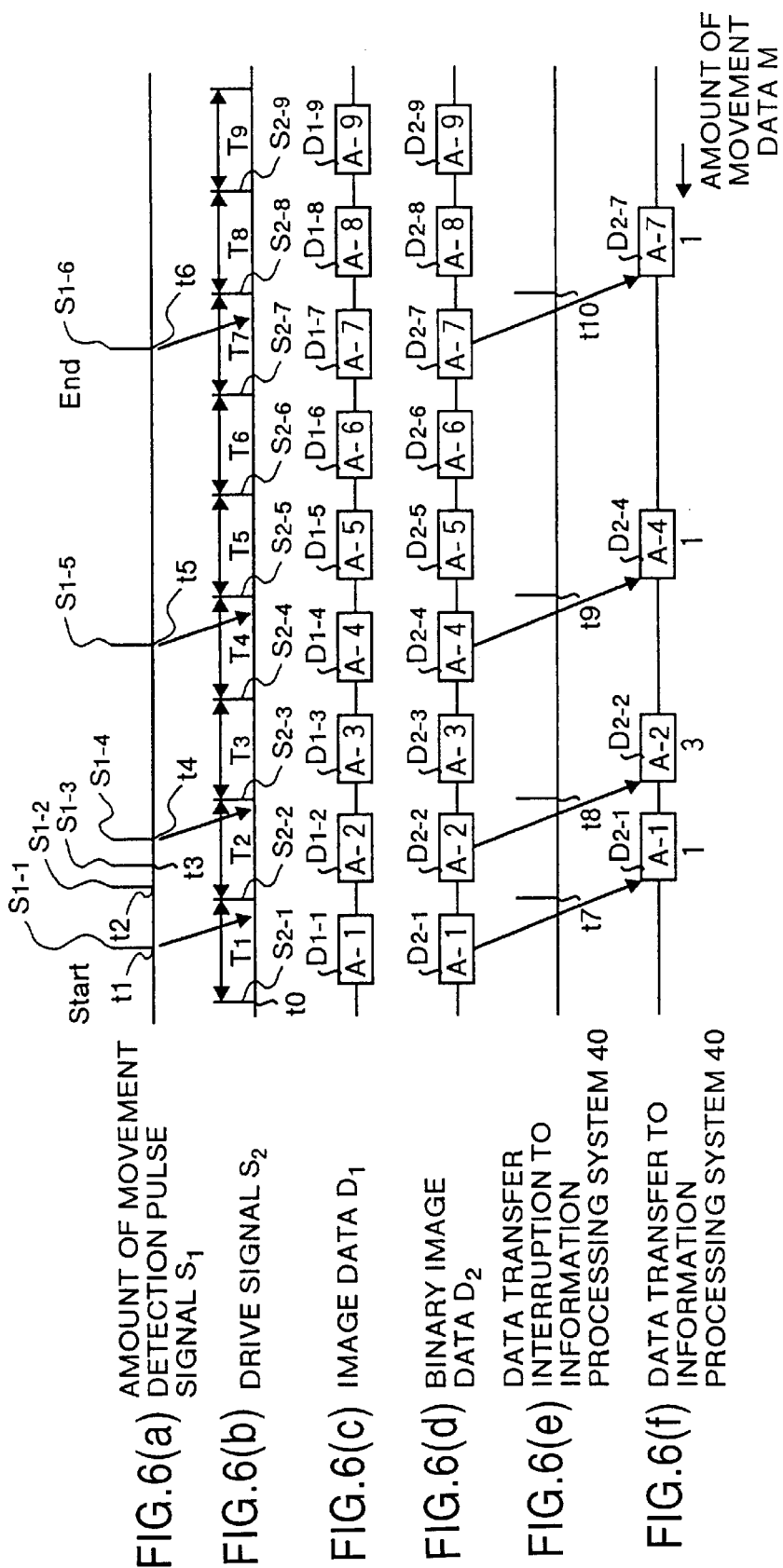
FIG. 6 is a timing chart which explains the operation of the second embodiment.

In step SB1 of FIG. 5, the read control section 101 sets the number of lines to be read L to "4", for example, and performs the processing at step SB2. At step SB2, the read control section 101 determines whether or not the number of lines to be read L and the number of lines that have been read X is equal. Because the image reading apparatus is not caused to slide over the paper the number of lines that have been read X will be zero. Therefore, the result of determination at step SB2 will be NO. At step SB3, the read control section 101 determines whether or not the amount of movement detection pulse $S_1$ is received at least once (in terms of the number of pulses) during the drive period $T_1$. At the time point $t_0$, the amount of movement detection pulse signal $S_1$ is not input, so that the result of determination at step SB3 will be NO. In such a case, the read control section 101 returns to the processing at step SB2 and repeats the processing in steps SB2 and SB3.

When the user presses the switch once and slides the housing 10 on the paper in the scanning direction, then the roller 13 is rotated because of the friction with the surface of the paper. Assuming that the roller 13 rotates for the predetermined amount during the drive period $T_1$, the amount of movement detection pulse signal $S_{1-1}$ will be input into the read control section 101 from the amount of movement detection section 22 at the time point $t_1$ shown in (a) in FIG. 6. In this case, because the amount of movement detection pulse signal $S_1$ (that is, the pulse signal $S_{1-1}$) has been input into the read control section 101, the result of determination at step SA3 will be YES. Amount of movement data M shown in FIG. 7 indicates the number of times the amount of movement detection pulse signal $S_1$ is input into the read control section 101 during one drive period. Thus, the amount of movement data M of "1" corresponding to the input line number A-1 indicates that only one amount of movement detection pulse signal $S_1$ (that is, pulse signal $S_{1-1}$) is input into the read control section 101 during one drive period (that is, drive period $T_1$).

At step SB4, the read control section 101 interrupts the information processing system 40 for data transfer at the time point $t_7$ shown in (e) in FIG. 6. In other words, the read control section 101 reads the binary image data $D_{2-1}$ (see (d) in FIG. 6) of the input line number A-1 at the time point $t_7$ from the buffer memory. Then, the read control section 101 transfers the binary image data $D_{2-1}$ together with the amount of movement data M (=1) during the drive period $T_1$ to the information processing system 40 through the I/F section 33 (see (f) in FIG. 6 and FIG. 7). The read control section 101 then performs the processing at step SB5. In this case, the amount of movement data M during the drive period $T_1$ is "1", and therefore the information processing system 40 displays the binary image data $D_{2-1}$ of the valid line number B-1 shown in FIG. 7 on the display section. Thus, there is no need to generate the binary image data $D_2$ by copying as described above.

At step SB5, the read control section 101 increments by 1 the number of lines that have been read X. Thus, the number of lines that have been read X will become "1". The read control section 101 then performs the processing at step SB2. During the next drive period $T_2$, the drive signal $S_{2-2}$ is input into the image reading section 21 and the image reading section 21 collects the image data $D_{1-2}$ corresponding to the input line number A-2 and inputs it into the image signal processing section 32. The image signal processing section 32 converts this image data $D_{1-2}$ into the binary image data $D_{2-2}$ and inputs it into the read control section 101. The read control section 101 stores this binary image data $D_{2-2}$ corresponding to the input line number A-2 in the buffer memory (not shown).

At step SA2, the read control section 101 again determines whether or not the number of lines to be read L is equal to the number of lines that have been read X. Since the number of lines to be read L is equal to "4" and the number of lines that have been read X is equal to "1", the result of determination at step SA2 will again be NO. Therefore, the read control section 101 performs the processing at step SA3. At step SA3, the read control section 101 determines whether or not at least one amount of movement detection pulse signal $S_1$ is received during the next drive period (that is, the drive period $T_2$).

Assume that the amount of movement detection pulse signals $S_{1-2}$, $S_{1-3}$ and $S_{1-4}$ are received one-by-one by the read control section 101 at the time points $t_2$, $t_3$ and $t_4$ shown in (a) in FIG. 6 during the drive period $T_2$. This phenomenon of reception of three amount of movement pulse signals $S_1$ during one drive period $T_2$ will occur when the scanning speed is greater than the specified value. In this case, as shown in FIG. 7, the amount of movement data M for the binary image data $D_{2-2}$ of the input line number A-2 will be "3".

Because three amount of movement detection pulse signals $S_{1-2}$, $S_{1-3}$ and $S_{1-4}$ are received by the read control section 101, the result of determination at step SB3 will be YES. At the next step SA4, the read control section 101 interrupts the information processing system 40 for data transfer at the time point $t_8$ shown in (e) in FIG. 6. Precisely, the read control section 101 reads the binary image data $D_{2-2}$ from the buffer memory at the time point $t_8$, and then transfers this binary image data $D_{2-2}$ together with the amount of movement data M (=3) to the information processing system 40.

Figure 7:
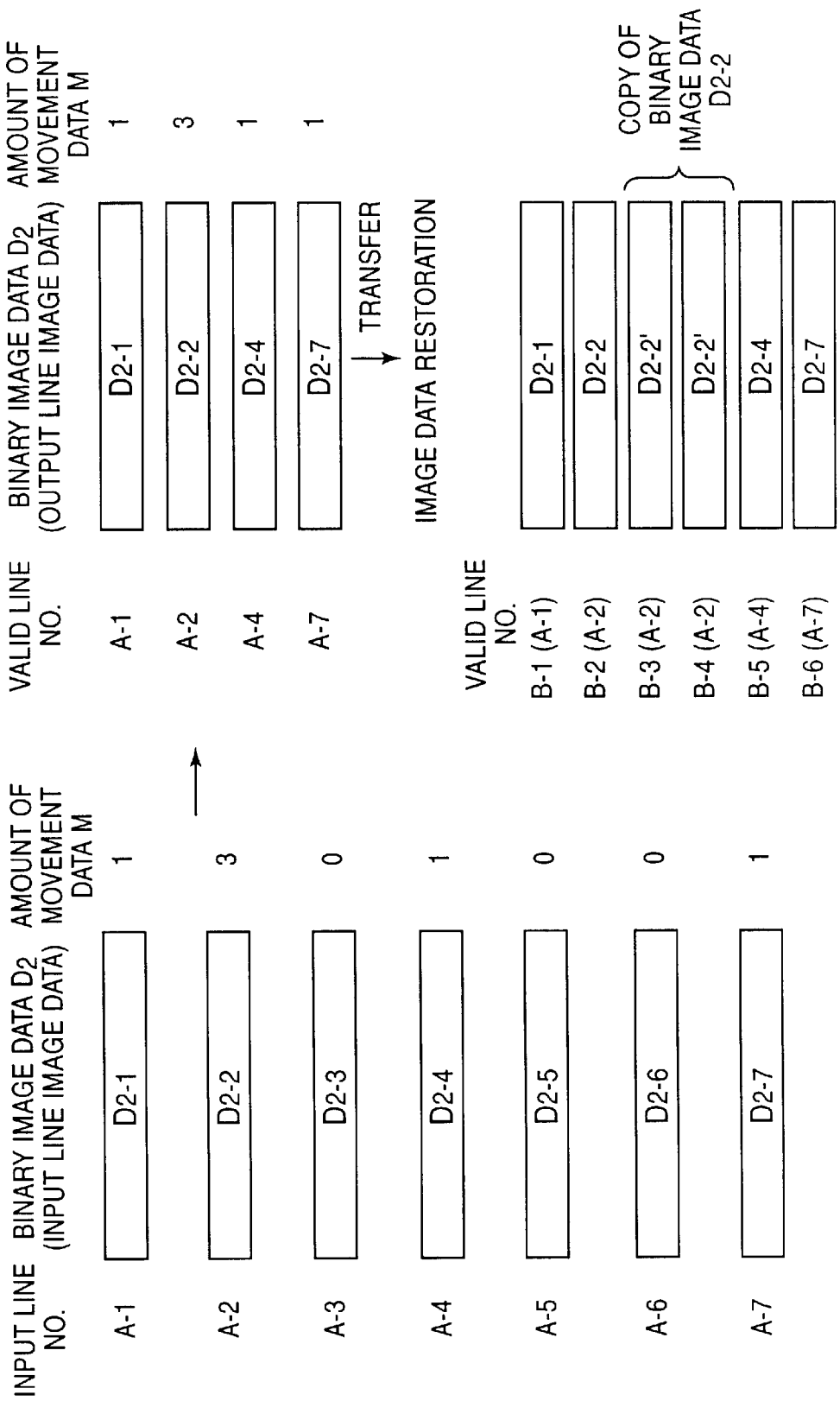
FIG. 7 is a diagram which explains the operation of the second embodiment.

As a result, the information processing system 40, as shown in FIG. 7, copies the binary image data $D_{2-2}$ of the input line number A-2 by the amount corresponding to the amount of movement data M-1 (=3−1=2) and thus generates the same binary image data $D_{2-2}'$ for two lines. Then, the information processing system 40 displays the binary image data $D_{2-2}$, $D_{2-2}'$ and $D_{2-2}'$, for three lines on the display section as the restored image data. The line numbers of the binary image data $D_{2-2}$, $D_{2-2}'$ and $D_{2-2}'$, for three lines are the valid line numbers B-2, B-3 and B-4, respectively, shown in FIG. 7.

At the next step SB5, the read control section 101 increments the number of lines that have been read X by one, and returns to the processing at step SB2. Because the number of lines that have been read X is "1", after incrementing it will become "2". During the next drive period $T_3$, the image reading section 21 inputs the drive signal $S_{2-3}$ into the image signal processing section 32. The image signal processing section 32 converts the image data $D_{1-3}$ into the binary image data $D_{2-3}$. The read control section 101 stores this binary image data $D_{2-3}$ in the buffer memory (not shown).

Assume that, as shown in FIG. 6, amount of movement detection pulse signal $S_1$ (corresponding to the image data $D_{1-3}$) is not input into the read control section 101 during the next drive period $T_3$. In this case, the amount of movement data M corresponding to the binary image data $D_{2-3}$ (corresponding to the input line number A-3) will be "0" as shown in FIG. 7. Therefore, the read control section 101 will not transfer the binary image data $D_{2-3}$ or the amount of movement data M to the information processing system 40 and hold it in the buffer memory.

During the next drive period $T_4$, the read control section 101 inputs the drive signal $S_{2-4}$ into the image reading section 21. Accordingly, as shown in FIG. 2, the image reading section 21 outputs the image data $D_{1-4}$ (corresponding to the input line number A-4) to the image signal processing section 32. The image signal processing section 32 converts this image data $D_{1-4}$ into the binary image data $D_{2-4}$.

Here, the binary image data $D_{2-4}$ is stored in the buffer memory (not shown) of the read control section 101. However, the image data $D_{2-3}$ is already present in the buffer memory. Therefore, the binary image data $D_{2-3}$ present in the buffer memory will be updated to the newly input binary image data $D_{2-4}$. Assume that, as shown in FIG. 6, an amount of movement detection pulse signal $S_{1-5}$ is input at the time point $t_5$ into the read control section 101 during the time period $T_4$. In this case, the result of the determination at step SB3 will be YES. At step SB4, the read control section 101 interrupts the information processing system 40 for data transfer at the time point $t_9$ shown in (e) in FIG. 6.

Precisely, the read control section 101 reads the binary image data $D_{2-4}$ from the buffer memory at the time point $t_9$, and then transfers it to the information processing system 40 together with the amount of movement data M. As a result, the information processing system 40 displays the aforementioned binary image data $D_{2-4}$ on the display section as the binary image data $D_{2-4}$ of the valid line number B-5 shown in FIG. 7.

At the next step SB5, the read control section 101 increments the number of lines that have been read X by one. Because the current number of lines that have been read X is equal to "2", after incrementing it will become "3". The read control section 101 then returns to processing at step SB2 and repeats the processing from step SA2 to step SB5. Assume that, as shown in FIG. 6, an amount of movement detection pulse signal $S_1$ is not input into the read control section 101 during the drive periods $T_5$ and $T_6$. Therefore, the amount of movement data M corresponding to the input line numbers A-5 and A-6 shown in FIG. 7 will be zero. Accordingly, the read control section 101 will not transfer the binary image data $D_{2-5}$ and $D_{2-6}$ and the amount of movement data M to the information processing system 40 but hold the data in the buffer memory.

Assume that the binary image data $D_{2-5}$ and $D_{2-6}$ in the buffer memory of the read control section 101 has been updated with the binary image data $D_{2-7}$. The read control section 101 receives an amount of movement detection pulse signal $S_{1-6}$ at the time point $t_6$ during the drive period $T_7$ from the amount of movement detection section 22. Therefore, the result of determination at the step SB3 will be YES. Because only one pulse signal is received, the amount of movement data M corresponding to the binary image data $D_{2-7}$ will be "1". Therefore, read control section 101 interrupts the information processing system 40 for data transfer at the time point $t_{10}$ shown in FIG. 6.

Precisely, the read control section 101 at the time point $t_{10}$ reads the binary image data $D_{2-7}$ and the amount of movement data M from the buffer memory and transfers it to the information processing system 40. As a result, the information processing system 40 displays the binary image data $D_{2-7}$ on the display section as the binary image data $D_{2-7}$ of the valid line number B-6. At the next step SB5, the read control section 101 increments the number of lines that have been read X by one. Since the current number of lines that have been read X is equal to "3", after incrementing it will become "4". The read control section 101 then returns to processing at step SB2. However, because the already set number of lines to be read L, that is "4", is equal to the number of lines that have been read X, that is "4", the result of determination at step SA2 will be YES. Therefore, the read control section 101 terminates the process in the flowchart of FIG. 3. By the way, it is mentioned above that the information processing system 40 displays the image on its display unit when it receives the binary image data $D_2$, however, the invention is not limited to this case. For example, the information processing system 40 may wait till it receives all the binary image data $D_{2-1}$, $D_{2-2}$, $D_{2-4}$ and $D_{2-7}$ for four lines and the amount of movement data M and display the data.

As described above, according to the second embodiment, the amount of movement data M together with the binary image data $D_2$ are transferred at the time of data transfer to the information processing system 40 thereby to generate the restored image data shown in FIG. 7 on the part of the information processing system 40. Therefore, in addition to the effect of the first embodiment described above, there is an effect that a buffer memory having a lesser capacity can be used. Accordingly, the overall size and cost of the apparatus can be reduced.

As compared with the first embodiment the data amount to be transferred to the information processing system 40 can be reduced in this second embodiment. Therefore, even if the speed of data transfer from the read control section 101 to the information processing system 40 is low, the problem that data is missed or the like does not occur.

As mentioned in the first embodiment, the binary image data $D_2$ to be transferred is temporarily stored in the buffer memory of the read control section 101, and then at the time of transfer, this binary image data $D_2$ is read from the buffer memory and transferred to the information processing system 40. The binary data in the buffer memory is transferred to information processing system 40 through the I/F section 33 at a high speed. Accordingly, it is necessary that an I/F section having a high transmission speed is used as the I/F section 33. The transmission speed of the I/F section 33 is determined depending on the data processing speed of the read control section 101. Thus, in the first embodiment, an I/F section having a low transmission speed can not be used as the I/F section 33 which fact disadvantageously deteriorates the versatility of the image reading apparatus.

Figure 8:
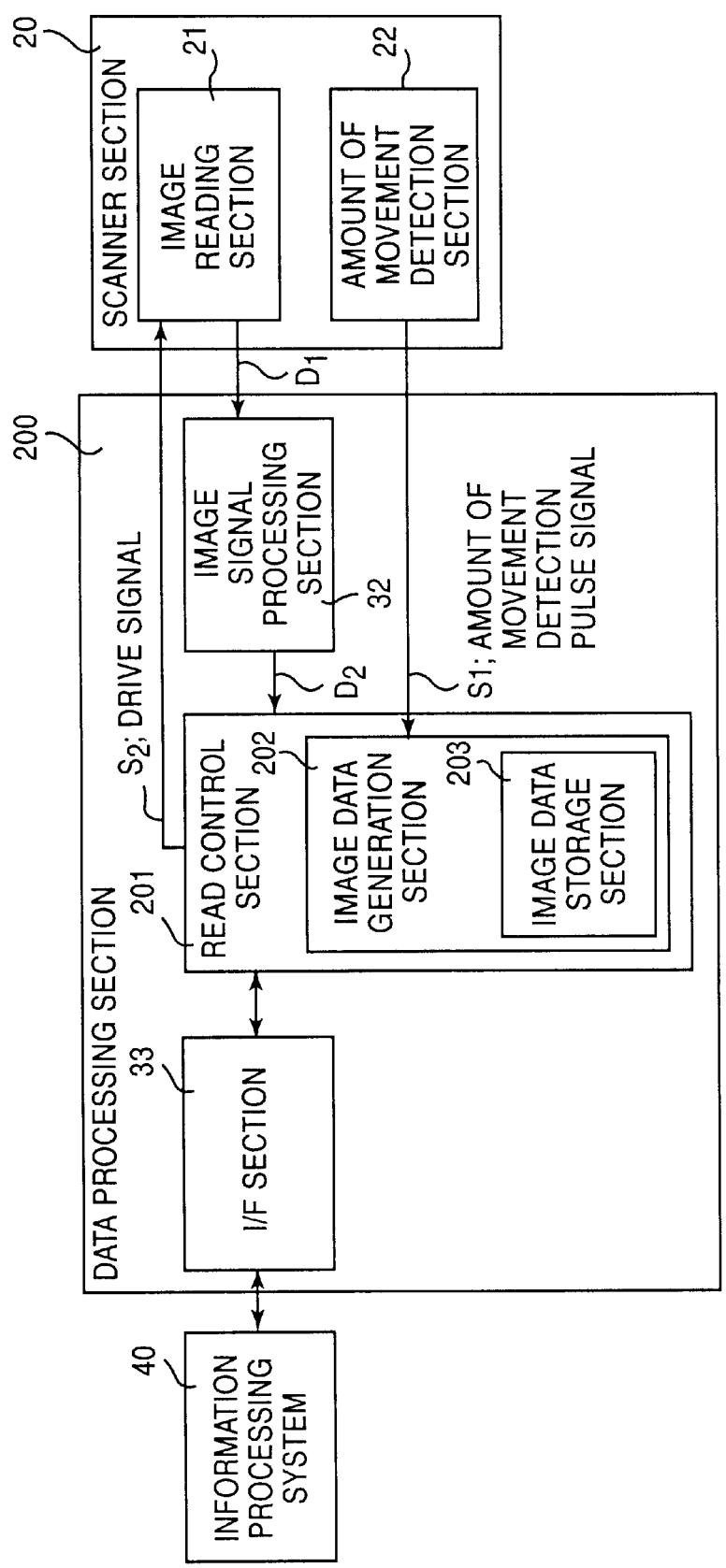
FIG. 8 is a block diagram which shows a configuration according to a third embodiment of the invention.

The third embodiment explained below overcomes this problem and improving the versatility of the image reading apparatus. FIG. 8 is a block diagram which shows a configuration of the third embodiment of the invention. The components in this figure that have the same or similar functions as those shown in FIG. 1 are designated by the same reference numerals, and to avoid the repetition they will not be described. As shown in this figure, the data processing section 100 shown in FIG. 1 is replaced by a data processing section 200. The data processing section 200 has a read control section 201. The read control section 201 has an image data generation section 202. The image data generation section 202 has an image data storage section 203.

The read control section 201 outputs the drive signal $S_2$ for driving the image reading section 21 and also receives the binary image data $D_2$ from the image signal processing section 32. Further, the read control section 201 provides a control over the transfer of the binary image data $D_2$ in the case where the amount of movement detection pulse signal $S_1$ is input at least once within one drive period ($T_1$, $T_2$, ...; see (b) in FIG. 2). The operations of the read control section 201 mentioned above are the same as the operations of the read control section 101 according to the first embodiment. The characteristics of the read control section 201 according to the third embodiment is that it once writes the binary image data $D_2$ to be transferred to the information processing system 40 in the image data storage section 203. When transferring the binary image data $D_2$ to the information processing system 40, the read control section 201 reads the binary image data $D_2$ stored in the image data storage section 203 and then transfers it to the information processing system 40 through the I/F section 33.

When the amount of movement detection pulse signal $S_1$ are received a plurality of times during one drive period, the image data generation section 202 copies the binary image data $D_2$ to be transferred and thus generates the same binary image data $D_2$ for a plurality of lines, and stores all the binary image data $D_2$ in the image data storage section 203. The difference between the buffer memory in the first embodiment and the image data storage section 203 in this third embodiment is that, the data write/read speed of the image data storage section 203 is lower than that of the buffer memory, but the image data storage section 203 can store a larger amount of data than the buffer memory. Thus, the data processing speed in the read control section 201 may be lower than that in the first embodiment described above. This permits a low data transfer speed in the I/F section 33 according to the third embodiment.

Figure 9:
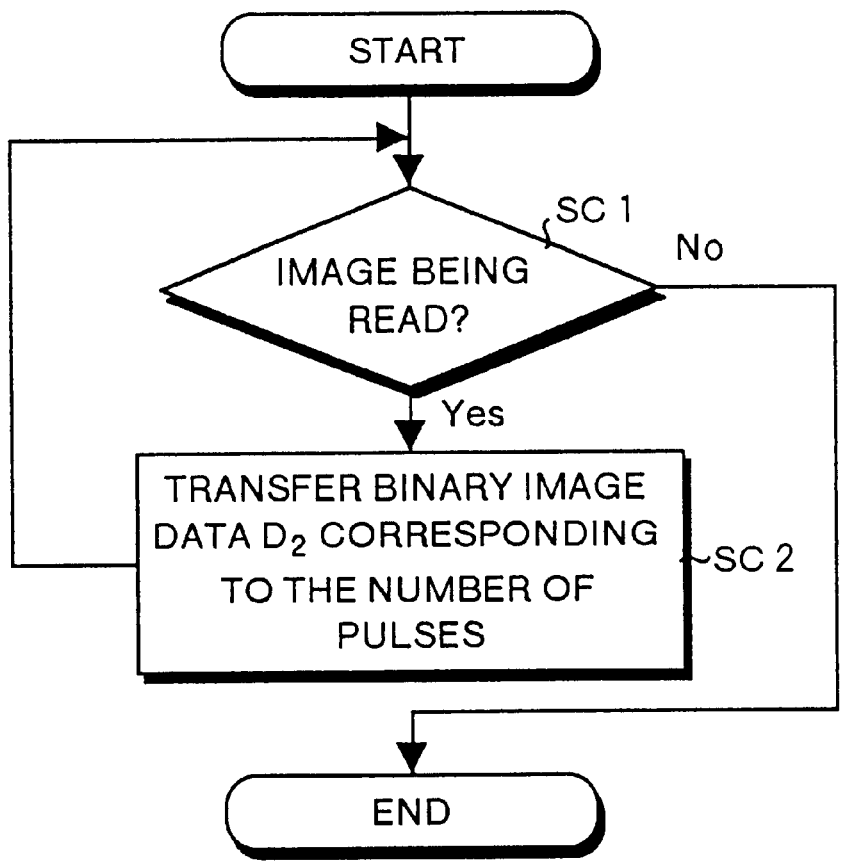
FIG. 9 is a flowchart which explains the operation of the third embodiment.

The basic operation of the third embodiment is similar to that of the first embodiment described above. In the third embodiment, however, the read control section 201 transfers the binary image data $D_2$ stored in the image data storage section 203 through the I/F section 33 to the information processing system 40. In other words, in step SC1 shown in FIG. 9, the read control section 201 determines whether or not the image is being read, that is, whether or not the switch for instructing to start the scanning operation is pressed by the user.

When the result of this determination is YES (that is the user presses the switch), the read control section 201 performs the processing at step SC2. At step SC2, the read control section 201 reads the binary image data $D_2$ stored in the image data storage section 203, and transfers it to the information processing system 40 through the I/F section 33. After transferring the data, the read control section 201 returns to the processing at step SC1 and repeats the process in this flowchart. When the user presses the switch once more, the 5 result of this determination at step SC1 will be NO so that the read control section 201 terminates the process in this flowchart.

As described above, according to the third embodiment, the binary image data $D_2$ are stored in the image data storage section 203 which has a lower write/read speed but higher storage capacity as compared to the buffer memory, and the binary image data $D_2$ read from this image data storage section 203 is transferred to the information processing system 40. Therefore, the data can be transferred without regard to the data processing speed of the read control section 201.

Thus, according to the third embodiment, the I/F section 33 having a lower transmission speed can be used without regard to the data processing speed of the read control section 201, and therefore the versatility of the image reading apparatus can be improved. In other words, the image read operation can be performed independently of the data processing speed of the read control section 201. By the way, the image data storage section 203 according to the third embodiment is applicable to the first embodiment.

The first to third embodiments of the invention were described in detail with reference to the drawings. The specific configuration of this invention, however, is not limited to the first to third embodiments, but the invention is applicable to any design change without departing from the scope and spirit of the invention. In the first and second embodiments, for example, the data processing section 100 may be incorporated in the information processing system 40 shown in FIG. 1, and the data processing section 100 provided in the information processing system 40 and the scanner section 20 may be connected to each other with cable. Further, in the first and second embodiments, the data processing section 100 and the scanner section 20 may be provided in the information processing system 40 to constitute an integrated system. Similarly, in the third embodiment, the data processing section 200 only, or the data processing section 200 and the scanner section 20 both may be provided in the information processing system 40.

Further, the first to third embodiments were described with reference to the case in which the apparatus (that is, the scanner section 20) is moved relative to a stationary paper. On the contrary, a conveyor for conveying the paper on may be provided to move the original sheet relative to a stationary apparatus.

Figure 10:
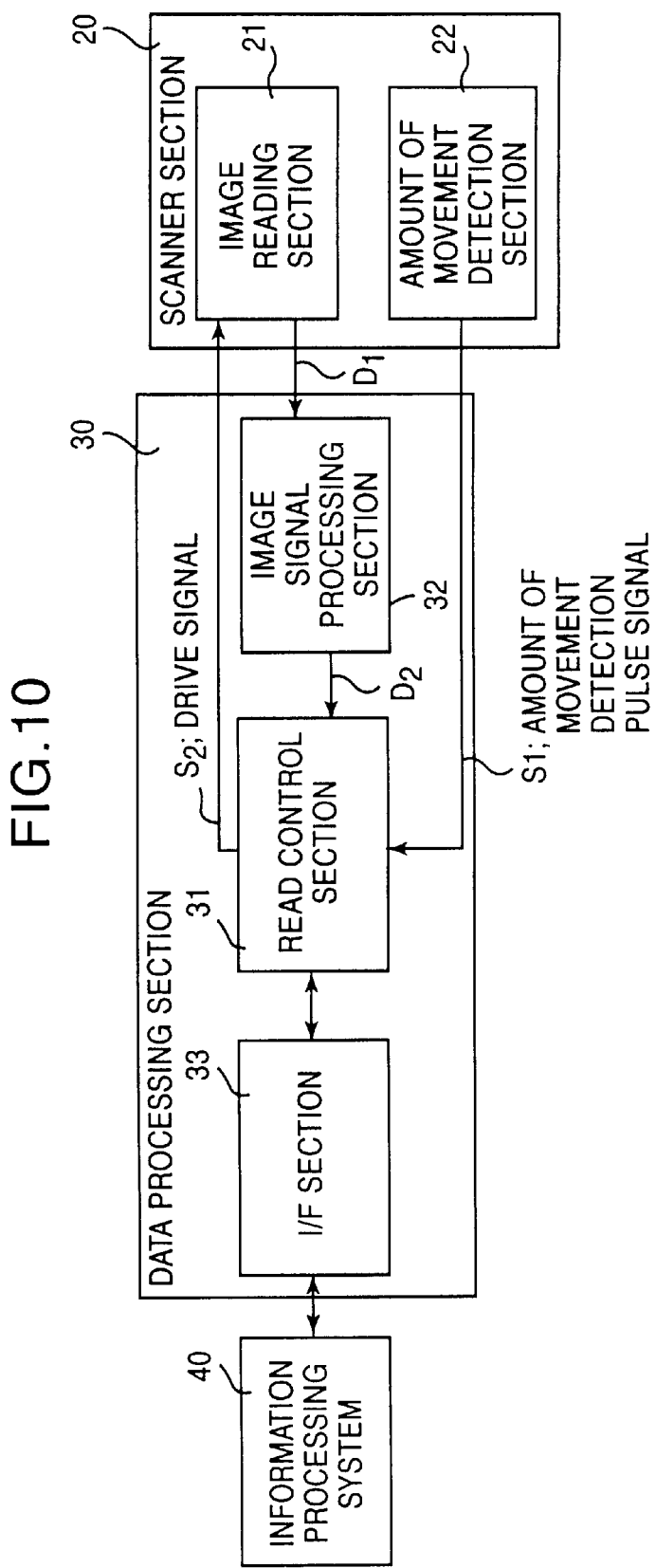
FIG. 10 is a block diagram which shows an example of configuration of an image reading apparatus which does not copy operation of image data of plural lines.

A comparison between first to third embodiment is explained with reference to FIG. 10 and FIG. 11. FIG. 10 shows a configuration of the image reading apparatus which does not copy the image data of plurality of lines. The section in this figure that are same or similar to those in FIG. 1 have been provided with the same reference numerals. The data processing section 100, the read control section 101, and image data generation section 102 have been replaced by data processing section 30 and read control section 31.

The read control section 31 outputs the drive signal $S_2$ for controlling the driving of the image reading section 21, and also receives the binary image data $D_2$ from the image signal processing section 32.

Figure 11:
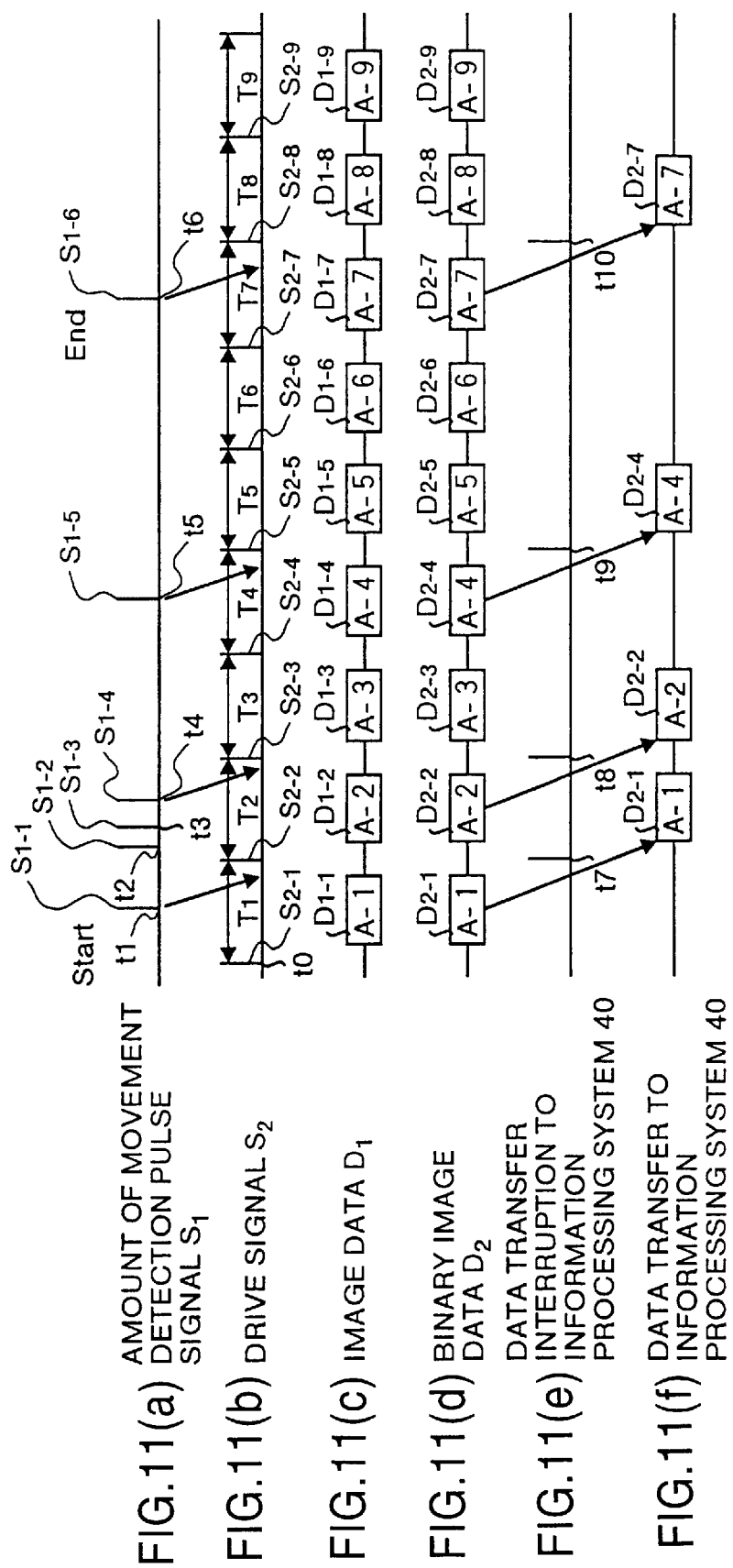
FIG. 11 is a timing chart which explains the operation of the image reading apparatus shown in FIG. 10.

The read control section 31 transfers the binary image data $D_2$ to the information processing system 40 through the I/F section 33 when the amount of movement detection pulse signal $S_1$ is received at least once in each of drive periods $T_1, T_2, \ldots$ (see (b) in FIG. 11). By the way, even if the amount of movement detection pulse signal $S_1$ is received more than one time during one drive period, the read control section 31 transfers the binary image data $D_2$ only once. The operation of the read control section 31 will be described in detail later.

Operation of the conventional image reading apparatus will be explained here with reference to the timing charts shown in FIG. 11. The amount of movement detection pulse signal $S_1$ shown at (a) in FIG. 11 is output by the amount of movement detection section 22. The amount of movement detection section 22 outputs the amount of movement detection pulse signal $S_1$ when the amount of movement in the scanning direction of the image reading apparatus reaches a predetermined value. The amount of movement detection signals $S_1$ at different timings are denoted as amount of movement detection pulse signals $S_{1-1}, S_{1-2}, S_{1-3}, \ldots, S_{1-6}$ for convenience. The drive signal $S_2$ shown at (b) in FIG. 11 is the one-pulse signal sequentially output to the image reading section 21 from the read control section 31 for each drive period ($T_1, T_2, \ldots, T_9$). The drive signal $S_2$ corresponding to the drive periods $T_1, T_2, \ldots, T_9$ are denoted as drive signals $S_{2-1}, S_{2-2}, \ldots, S_{2-9}$ respectively, for convenience.

The image data $D_1$ shown at (c) in FIG. 11 is data of one line on the paper that is read by the image reading section 21 in the scanner section 21. The image data $D_1$ corresponding to the drive periods $T_1, T_2, \ldots, T_9$ are denoted as image data $D_{1-1}, D_{1-2}, \ldots, D_{1-9}$ respectively for convenience. The lines numbers corresponding to the image data $D_{1-1}, D_{1-2}, \ldots, D_{1-9}$, are denoted as input line numbers A-1, A-2, ..., A-9. Here it is important to note that these input line numbers A-1, A-2, ..., A-9 are serial numbers of the image data $D_1$ input at intervals of the drive period from the image reading section 21, and that these are not the numbers corresponding to the lines on the paper.

The binary image data $D_2$ shown at (d) in FIG. 11 is the binary data generated by the image signal processing section 32 from the analog image data $D_1$. The binary image data $D_2$ corresponding to the image data $D_{1-1}, D_{1-2}, \ldots, D_{1-9}$ are denoted as binary image data $D_{2-1}, D_{2-2}, \ldots, D_{2-9}$. The input line numbers A-1, A-2, ..., A-9 are attached to these binary image data $D_{2-1}, D_{2-2}, \ldots, D_{2-9}$, respectively.

When reading the image on the paper, the user places the image reading apparatus in such a position that the image reading surface 10a touches the paper at the reading start position on the paper. In this condition, the roller 13 also touches the paper. The user then presses a switch (not shown) once. As a result, the read control section 31 outputs the drive signal $S_{2-1}$ to the image reading section 21 at a time point $t_0$ shown in FIG. 11, and also monitors whether or not the amount of movement detection pulse $S_1$ is received during the drive period $T_1$ that follows after output of the drive signal $S_{2-1}$.

When the drive signal $S_{2-1}$ is received by the image reading section 21, it reads a line of image on the paper, and outputs the image data $D_{1-1}$ (input line number A-1) to the image signal processing section 32. The image data $D_{1-1}$ corresponding to the input line number A-1 is converted to binary image data $D_{2-1}$ by the image signal processing section 32. This binary image data $D_{2-1}$ is input into the read control section 31. The read control section 31 stores this binary image data $D_{2-1}$ in a buffer memory (not shown) until the binary image data $D_{2-2}$ corresponding to the next image data $D_{1-2}$ (input line number A-2) is received.

The user performs an image reading operation with the image reading apparatus. That is, the user places the image reading apparatus on a paper in such a manner that the image reading surface 10a touches the paper at the reading start position. Then, the user holds the housing 10 in hand and slides the image reading apparatus in the scanning direction. The roller 13 rotates as a result of friction with the paper. With the start of the rotation of the roller 13, the detection of the amount of movement of the image reading section 21 (in other words, the image reading apparatus) also starts in the amount of movement detection section 22.

Let us assume that the amount of movement detection pulse signal $S_{1-1}$ is input into the read control section 31 from the amount of movement detection section 22 at a time point $t_1$ during the drive period $T_1$ as shown in FIG. 11. In this case, the read control section 31 interrupts the information processing system 40 for data transfer at a time point $t_7$. Specifically, at the time point $t_7$, the read control section 31 reads the binary image data $D_{2-1}$ from the buffer memory and then transfers this data to the information processing system 40 through the I/F section 33 (see (f) in FIG. 11).

After that, the image data $D_{1-2}$ of and subsequent to the input line number A-2 are output to the image signal processing section 32 from the image reading section 21 each time the drive signal $S_2$ is input, i.e., at each drive period. Thus, each time the image signal processing section 32 inputs the binary image data $D_2$ of one line into the read control section 31, the read control section 31 updates the earlier binary image data $D_2$ stored in the buffer memory with the newly input binary image data $D_2$.

Further, the read control section 31 monitors whether or not the amount of movement detection pulse signal $S_1$ is received during one drive period. When the amount of movement detection pulse signal $S_1$ is received during one drive period, the read control section 31 executes the data transfer interruption process as shown by (e) in FIG. 11. Accordingly, the binary image data $D_2$ of one line stored in the buffer memory is transferred to the information processing system 40.

Thus, the data transfer interrupt process is executed at time points $t_7$, $t_8$, $t_9$ and $t_{10}$, so that the binary image data $D_{2-1}$, $D_{2-2}$, $D_{2-4}$ and $D_{2-7}$ are transferred to the information processing system 40. These binary image data $D_{2-1}$, $D_{2-2}$, $D_{2-4}$ and $D_{2-7}$ are displayed on the display of the information processing system 40.

As shown in FIG. 11, the amount of movement detection pulse signal $S_1$ (in this case, the amount of movement detection pulses $S_{1-2}$, $S_{1-3}$, $S_{1-4}$) is input into the read control section 31 three times at time points $t_2$, $t_3$ and $t_4$ during one drive period $T_2$. This phenomenon occurs when the image reading section 21 (in other words, the image reading apparatus) moves (in other words, moved by the user) in the scanning direction at a speed that is higher than a speed specific to the image reading apparatus. However, although the amount of movement detection pulse $S_1$ is input into the read control section 31 three times, the read control section 31 executes the data transfer interruption process only once, that is, at the time point $t_8$.

On the other hand, as shown in FIG. 11, the amount of movement detection pulse $S_1$ is not input at all into the read control section 31 during the drive periods of $T_3$, $T_5$, $T_6$, $T_8$ and $T_9$. This phenomenon occurs when the image reading section 21 (in other words, the image reading apparatus) moves (in other words, moved by the user) in the scanning direction at a speed that is lower than the speed specific to the image reading apparatus or when the power of the image reading apparatus is turned OFF. In such a case, the read control section 31 only updates the binary image data $D_2$ that has been input previously and stored in the buffer memory with the newly input binary image data $D_2$, and does not transfer any data to the information processing system 40.

After sliding the image reading apparatus on the paper from the read start position to the read end position the user presses the switch once again. When the switch is pressed a second time, it indicates that the image reading operation is to be terminated. As a result, the read control section 31 terminates the process of data transfer to the information processing system 40.

By the way, when the scanning speed is greater than a specified value, the read control section 31 of the conventional image reading apparatus is supplied with the amount of movement detection pulse signal $S_1$ (that is, the pulse signals $S_{1-2}$, $S_{1-3}$ and $S_4$) three times during one drive period $T_2$ as shown in FIG. 11. In other words, the image reading section 21 (that is, image reading apparatus) has moved over the distance corresponding to three lines during one drive period $T_2$. However, although the image reading apparatus has moved a distance corresponding to three lines, only one line of binary image data $D_{2-2}$ is transferred to the information processing system 40.

Thus, in the information processing system 40, only a line of image is displayed in spite of the fact that three lines of image should originally be displayed during the drive period $T_2$. As a consequence, the image gets contracted. Such contraction of the image leads to the problem that the quality of the image is deteriorated.

In comparison to this, in first to third embodiments, if the movement detection pulse is input a plurality of times during a time period required for reading a single line then image data for lines equivalent to the number of movement detection pulses is transmitted to the information processing system. As a consequence, an image having no contraction can be obtained.

As described above, according to one aspect of the present invention, the image data generation unit generates a binary image data corresponding to the number of lines for which the image reading unit was moved even in the case where the image reading unit is moved at a speed which is higher than a specified value. Therefore, there is no missing binary image data, and, hence, an image free of contraction in the scanning direction can be obtained.

Further, image data for a plurality of lines are generated based on the image data of one line acquired by the image reading unit. Therefore, even if the scanning speed is higher than a specified value, there is no missing binary image data, and, hence, an image free of contraction in the scanning direction can be obtained.

Further, image data for a plurality of lines are generated by duplicating the image data of one line acquired by the image reading unit. Therefore, even if the scanning speed is higher than a specified value, there is no missing binary image data, and, hence, an image free of contraction in the scanning direction can be obtained.

Further, the transmission speed of the data is independent of the speed of reading or processing of the data. Therefore, an interface having a low transmission speed can be used, and, hence, the versatility of the image reading apparatus can be improved.

According to another aspect of the present invention, the following effect is obtained in addition to the effect that an image free of contraction in the scanning direction is produced. That is, in this aspect of the present invention, the image data and the detection result of the amount of movement detection unit are transferred to the image data generation unit by the transfer unit through the interface, the image data are generated on the part of the image data generation unit. As a result, the data amount generated on the part of the image reading unit is minimized, and therefore, the size and cost of the image reading apparatus can be considerably reduced.

According to still another aspect of the present invention, image data in the same number of lines as the number of lines moved by the image reading unit are generated by the image generation unit. Therefore, even if the scanning speed is higher than a specified value, there is no missing binary image data, and, hence, an image free of contraction in the scanning direction can be obtained.

According to still another aspect of the present invention, image data in the same number of lines as the number of lines moved by the image reading unit are generated by the image data generation unit, and, therefore, even in the case where the image reading apparatus and the image reading medium move relatively to each other over one line, an image free of contraction in the scanning direction is produced.

Although the present invention has been described with respect to a specific embodiment for a complete and clear disclosure, the appended claims are not to be thus limited but are to be construed as embodying all modifications and alternative constructions that may occur to one skilled in the art which fairly fall within the basic teaching herein set forth.

What is claimed is:

1. An image reading apparatus which optically reads an image divided into a plurality of lines on a medium, said image reading apparatus comprising:
   an image reading unit which obtains an image data corresponding to the image on the medium by reading the image of a single line at a predetermined time interval;
   an amount of movement detection unit which detects an amount of movement of said image reading unit relative to said medium; and
   an image data generation unit which generates an image data based on a result of detection by said amount of movement detection unit in such a manner as to attain a same number of lines as the number of lines by which said image reading unit is moved.

2. The image reading apparatus according to claim 1, wherein said image data generation unit generates the image data corresponding to a plurality of lines based on the image data of one line acquired by said image reading unit when said image reading unit has moved for a plurality of the lines during one time interval.

3. The image reading apparatus according to claim 2, wherein said image data generation unit generates the image data corresponding to a plurality of lines by duplicating the image data of one line acquired by said image reading unit when said image reading unit has moved for a plurality of the lines during one time interval.

4. The image apparatus according to claim 1, further comprising:
   a storage unit; and
   a transfer unit which causes said storage unit to store the image data acquired by said image reading unit and the image data generated by said image data generation unit, reads the image data from said storage unit, and transfers the image data to an external device through an interface.

5. An image reading apparatus which optically reads an image divided into a plurality of lines on a medium, said image reading apparatus comprising:
   an image reading unit which obtains an image data corresponding to the image on the medium by reading the image of a single line at a predetermined time interval;
   an amount of movement detection unit which detects an amount of movement of said image reading unit relative to said medium; and
   a transfer unit which transfers the image data acquired by said image reading unit and a detection result of said amount of movement detection unit through an interface; and
   an image data generation unit which generates an image data based on said image data transferred by said transfer unit and said result of detection of said amount of movement detection unit in such a manner as to attain a same number of lines as the number of lines by which said image reading unit is moved.

6. The image reading apparatus according to claim 5, wherein said image data generation unit generates the image data corresponding to a plurality of lines based on the image data of one line acquired by said image reading unit when said image reading unit has moved for a plurality of the lines during one time interval.

7. The image reading apparatus according to claim 6, wherein said image data generation unit generates the image data corresponding to a plurality of lines by duplicating the image data of one line acquired by said image reading unit when said image reading unit has moved for a plurality of the lines during one time interval.

8. An image processing apparatus which processes an image divided into a plurality of lines to be optically read from a medium, said image processing apparatus comprising:
   an image reading unit which obtains an image data corresponding to the image on the medium by reading the image of a single line at a predetermined time interval;
   an amount of movement detection unit which detects an amount of movement of said image reading unit relative to said medium; and
   an image data generation unit which generates an image data based on a result of detection by said amount of movement detection unit in such a manner as to attain a same number of lines as the number of lines by which said image reading unit is moved.

9. An image processing apparatus which receives image data from an image reading apparatus, which image reading apparatus obtains the image data by reading a single line of an image divided into a plurality of lines on a medium at a predetermined time interval, said image processing apparatus comprising:
   an image data generation unit which duplicates the received image data for one time interval to attain a same number of lines as the number of lines moved relatively by said image reading apparatus and said image reading medium, when said image reading apparatus and said image reading medium move relative over one line during a reading period of one line in said image reading medium.

10. An image reading apparatus which optically reads an image divided into a plurality of lines on a medium, said image reading apparatus comprising:
    an image reading unit which obtains an image data of the image on the medium by reading the image of a single line at a predetermined time interval when moved relative to said medium,
    a detection unit which detects a number of lines for which said image reading unit is moved during one time interval; and
    an image data generation unit which generates an image data corresponding to lines for which the image data is not available when the number of lines corresponding to which image data is acquired by said image reading unit is less then the number of lines detected by said detection unit.

11. An image reading apparatus comprising:
    an image reading unit which reads one of a plurality of lines of an image at every specific time interval, the image being printed on a medium;
    a detection unit which detects a relative amount of movement between said image reading unit and said medium; and
    a control unit which calculates a relative amount of movement between said image reading unit and said medium during a time period required for reading one line of the image, determines if the calculated relative amount of movement is greater than a width of one line, when the calculated relative amount of movement is greater than the width of one line determines a number of lines equivalent to the calculated relative amount of movement, and outputs an image data for the determined number of lines by coping the image data read by said image reading unit.

12. An image reading apparatus comprising:

an image reading unit which reads one of a plurality of lines of an image at every specific time interval, the image being printed on a medium;

a detection unit which detects a relative amount of movement between said image reading unit and said medium, and outputs a signal each time when a detected relative amount of movement becomes equal to a width of one line; and a control unit which determines the number of times a signal is output by said detection unit during a time period required for reading one line of the image, when the signal is output for a plurality of times outputs an image data for a number of lines corresponding to the number of times the signal is output by coping the image data read by said image reading unit, and when no signal is output does not output the image data read by said image reading unit.

* * * * *